(12) United States Patent
Fisher et al.

(10) Patent No.: US 11,555,548 B2
(45) Date of Patent: Jan. 17, 2023

(54) MIXING VALVES, VALVE MODULES, AND VALVE MODULE ASSEMBLIES

(71) Applicant: Masco Canada Limited, St. Thomas (CA)

(72) Inventors: Bryan Fisher, Appin (CA); Kyle Van Patter, St. Thomas (CA); Xan Vy Du, London (CA)

(73) Assignee: Masco Canada Limited, St. Thomas (CA)

( * ) Notice: Subject to any disclaimer, the term of this patent is extended or adjusted under 35 U.S.C. 154(b) by 279 days.

(21) Appl. No.: 17/060,317

(22) Filed: Oct. 1, 2020

(65) Prior Publication Data

US 2021/0102632 A1 Apr. 8, 2021

Related U.S. Application Data

(60) Provisional application No. 62/911,468, filed on Oct. 7, 2019.

(51) Int. Cl.
*F16K 11/22* (2006.01)
*G05D 16/00* (2006.01)

(52) U.S. Cl.
CPC ............ *F16K 11/22* (2013.01); *G05D 16/028* (2019.01)

(58) Field of Classification Search
CPC ........ F16K 11/202; F16K 11/10; F16K 11/20; F16K 11/22; F16K 19/006; G05D 16/028; E03C 1/0412
See application file for complete search history.

(56) References Cited

U.S. PATENT DOCUMENTS

| | | | | |
|---|---|---|---|---|
| 3,612,104 A * | 10/1971 | Busquets | ............... | F16K 11/202 137/637.4 |
| 3,921,659 A | 11/1975 | Rudewick, III | | |
| 4,681,140 A * | 7/1987 | Hayman | ............... | F16K 11/074 137/613 |
| 4,981,156 A * | 1/1991 | Nicklas | ................. | F16K 11/202 74/543 |
| 5,129,576 A * | 7/1992 | Pullen | ................ | G05D 23/1353 236/12.2 |
| 6,123,094 A | 9/2000 | Breda | | |
| 6,185,757 B1 | 2/2001 | Gardenier et al. | | |
| 6,237,622 B1 | 5/2001 | Cook et al. | | |
| 6,279,604 B1 | 8/2001 | Korb et al. | | |
| 6,517,006 B1 | 2/2003 | Knapp | | |
| 6,799,604 B1 * | 10/2004 | Samwell | ............... | F16K 11/074 137/636.4 |
| 7,344,088 B2 | 3/2008 | Yang | | |
| 7,850,088 B2 * | 12/2010 | Wei | ...................... | G05D 23/136 236/12.1 |

(Continued)

FOREIGN PATENT DOCUMENTS

CN 201176034 Y 1/2009
CN 203363292 U 12/2013

(Continued)

*Primary Examiner* — Jessica Cahill
(74) *Attorney, Agent, or Firm* — Reising Ethington P.C.

(57) ABSTRACT

The present disclosure is directed to a mixing valve pressure balancer and temperature controller module, a mixing valve flow diverter module, a modular assembly including the pressure balancer and temperature controller module and the flow diverter module, and a mixing valve including the modular assembly.

22 Claims, 16 Drawing Sheets

(56) References Cited

U.S. PATENT DOCUMENTS

| | | |
|---|---|---|
| 9,182,045 B2 | 11/2015 | Brouwer et al. |
| 9,740,215 B2 | 8/2017 | Ruga |
| 10,025,326 B2 | 7/2018 | Ottelli |
| 10,119,621 B2 | 11/2018 | Breda |
| 10,935,996 B2 * | 3/2021 | Ottelli ................ G05D 23/1313 |
| 2003/0101510 A1 * | 6/2003 | Ottelli .................... E03C 1/023 |
| | | 4/675 |
| 2003/0234295 A1 | 12/2003 | Mace |
| 2005/0076960 A1 * | 4/2005 | Luig .................... F16K 11/202 |
| | | 137/606 |
| 2006/0243813 A1 | 11/2006 | Beck |
| 2007/0158460 A1 | 7/2007 | Lev |
| 2013/0334324 A1 * | 12/2013 | Ruga .................... F16K 31/002 |
| | | 236/12.13 |
| 2014/0261813 A1 * | 9/2014 | Brouwer ................. F16K 11/00 |
| | | 137/625.46 |
| 2015/0220090 A1 * | 8/2015 | Ottelli ................. G05D 23/1346 |
| | | 236/12.2 |
| 2016/0244954 A1 | 8/2016 | Van Leyen et al. |
| 2017/0016215 A1 | 1/2017 | Ladron Jimenez |
| 2017/0090491 A1 | 3/2017 | Nobili |
| 2017/0152955 A1 | 6/2017 | Sansum et al. |
| 2017/0312768 A1 | 11/2017 | Snitil |

FOREIGN PATENT DOCUMENTS

| | | | |
|---|---|---|---|
| WO | WO-2007072526 A1 * | 6/2007 | ........... G05D 23/136 |
| WO | 2007110187 A1 | 10/2007 | |
| WO | 2017110187 A1 | 6/2017 | |
| WO | 2018142235 A1 | 8/2018 | |
| WO | WO-2018142235 A1 * | 8/2018 | ......... G05D 23/1313 |

\* cited by examiner

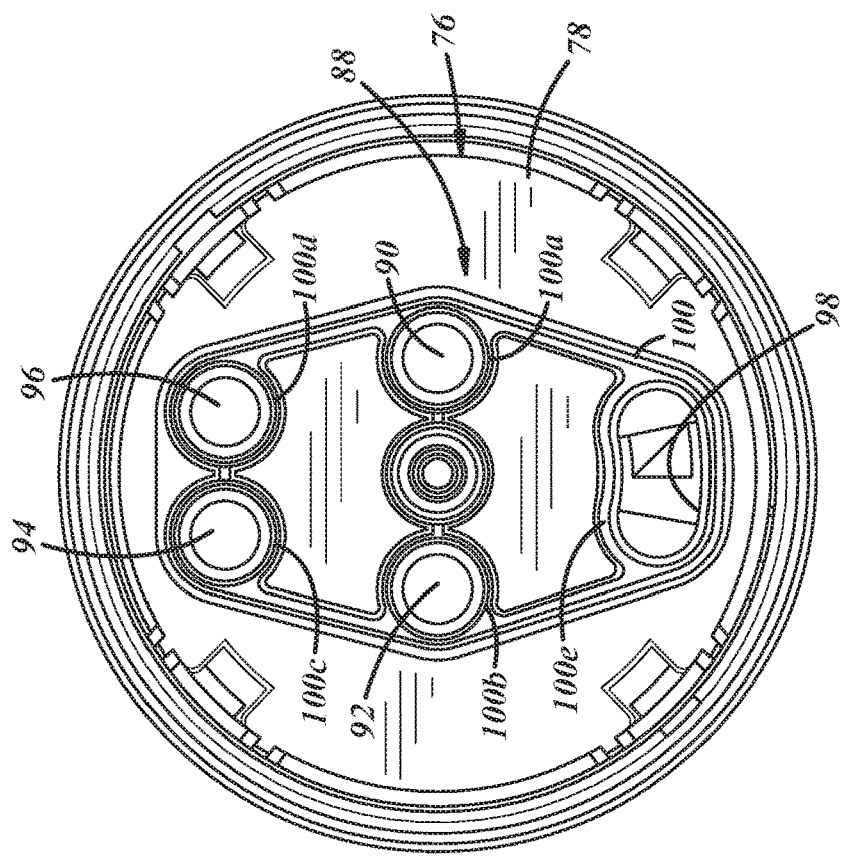
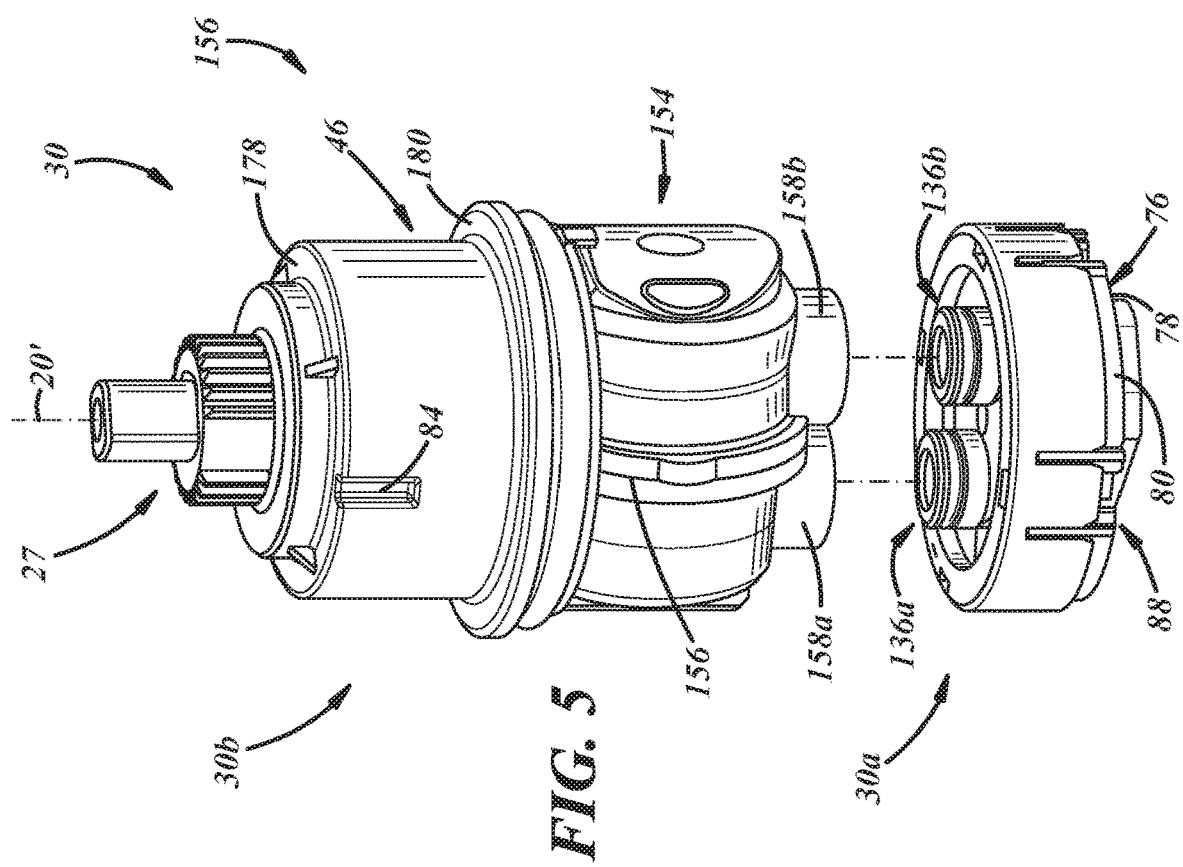

MIXING VALVES, VALVE MODULES, AND VALVE MODULE ASSEMBLIES

TECHNICAL FIELD

This disclosure relates generally to valves and, more particularly, to mixing valves.

BACKGROUND

In general, mixing valves are configured to admit separate inflows of hot water and cold water, mix the hot water and the cold water, and output a combined outflow of hot and cold mixed water. More specifically, mixing valves are configured to allow manual temperature control of mixed hot and cold water, automatic pressure-balanced or thermostatic control of mixed hot and cold water, manual volume control of mixed hot and cold water, or manual flow diversion control of mixed hot and cold water to two or more different devices, like a fixed shower head, a movable shower wand, or a tub spout. In one example, a sequential mixing valve includes a single handle, which, upon rotation, gradually opens an internal passage allowing a flow of cold water to gradually increase to a maximum and, upon further rotation, maintains the maximum flow of cold water but gradually increases a flow of hot water to raise the temperature of mixed hot and cold water. In another example, a concentric mixing valve includes two concentrically arranged handles; one to increase flow of mixed hot and cold water, and another one to control the temperature of the mixed hot and cold water. Although many such valves have enjoyed much commercial success, some valve designs may be unnecessarily complicated and costly.

BRIEF DESCRIPTION OF THE DRAWINGS

FIG. 5 is an exploded perspective view of the modular assembly of FIG. 2;

FIG. 6 is an end view of the modular assembly of FIG. 5, illustrating inlets and outlets;

DETAILED DESCRIPTION

In general, a mixing valve will be described using one or more examples of illustrative embodiments described with reference to use as a tub and shower mixing valve for hot and cold water. However, it will be appreciated as the description proceeds that the presently disclosed subject matter is useful in many different applications and may be implemented in many other embodiments. Accordingly, the mixing valve may be used for mixing any fluids for any purpose. This application claims the benefit of U.S. Provisional Application No. 62/911,468 filed Oct. 7, 2019, which application is incorporated herein by reference in its entirety.

Figure 1:
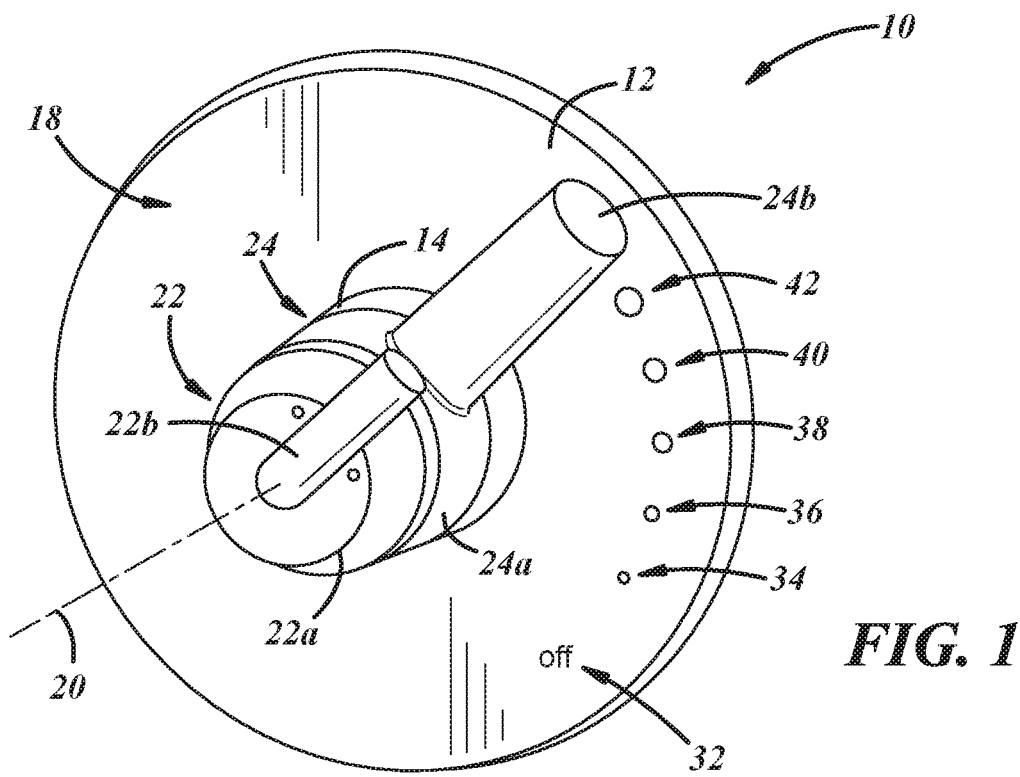
FIG. 1 is a perspective view a portion of a mixing valve according to an illustrative embodiment of the present disclosure, including an escutcheon plate, an escutcheon tube, a diverter control handle, and a temperature control handle.
Figure 16:
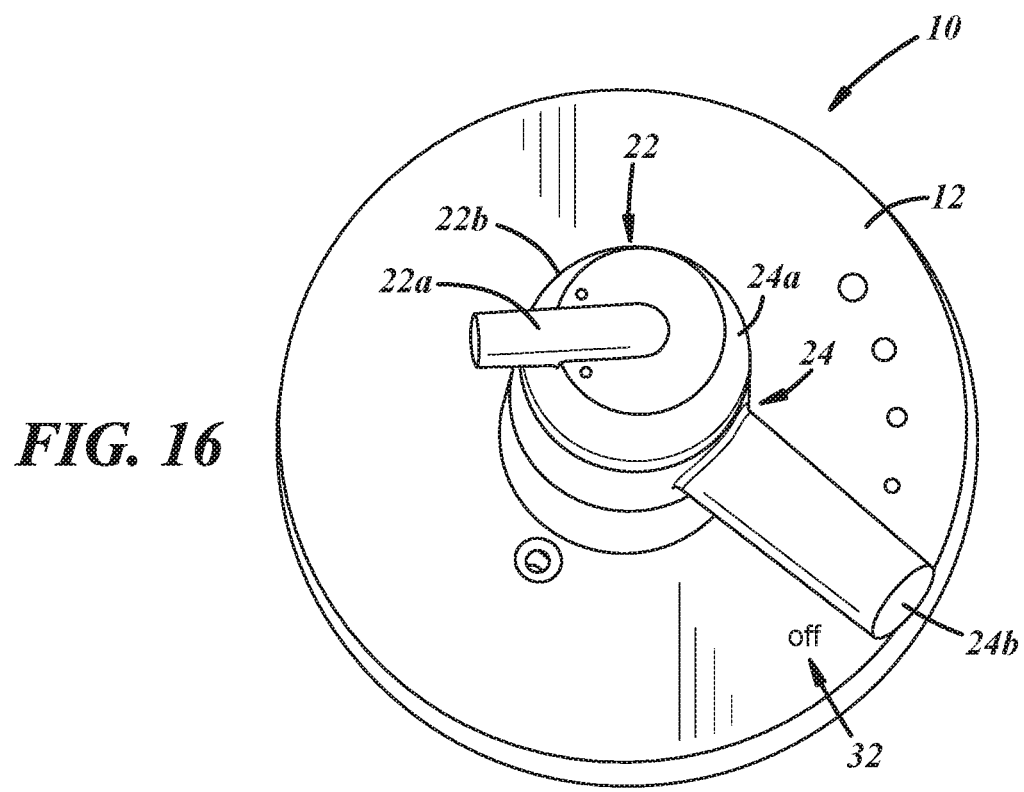
FIG. 16 is a perspective view of the mixing valve shown in FIG. 15, and also including the temperature control handle coupled to the adapter and shown in the hot limit stop position.

Referring specifically to the drawings, FIG. 1 shows a front portion of an illustrative embodiment of a mixing valve 10, which may be used as a tub and shower pressure balancer, temperature controller, and flow diverter. The mixing valve 10 may include an escutcheon plate 12, and an escutcheon tube 14 extending through the escutcheon plate 12 from a rear side 16 (FIG. 2) of the plate to a front side 18 of the plate 12.

The mixing valve 10 includes a plurality of concentric handles that are rotatable about a common rotation axis 20 and that include a temperature control handle 22 carried in an axially outward position and a diverter control handle 24 carried in an axially inward position with respect to the temperature control handle 22 and arranged concentrically with respect to the temperature control handle 22. The handles 22, 24 may include hubs 22a, 24a, and levers 22b, 24b extending away from the hubs, or may include any other suitable types/configurations of handles. As will be discussed in greater detail below and with reference to FIG. 2, the temperature control handle 22 may be coupled to a stem 26 of a temperature control valve 27, and the diverter control handle 24 may be coupled to a sleeve 28 carried over and around the rotatable temperature control valve 27, and part of a pressure balancing, temperature controlling, and flow diverting assembly 30.

In any event, and with reference again to FIG. 1, the diverter control handle 24 is shown in a diverted on position distal with respect to an off position, and the temperature control handle 22 is shown in a hot/cold intermediate position with respect to the diverter control handle 24. The escutcheon plate 12 may include sequential indicia, including an "off" position 32, and a plurality of diverted "on" positions. The diverted positions may include a first diverted position 34 that may include a tub outlet position, a second diverted position 36 that may include a tub and first shower outlet position, a third diverted position 38 that may include a first shower outlet position, a fourth diverted position 40 that may include a first and second shower outlet position, and a fifth diverted position 42 that may include a second shower outlet position. Of course, the diverted positions can be arranged in any other suitable manner, for instance, wherein the first diverted position is a first shower outlet position, and the fifth diverted position is a tub outlet position, or wherein the first diverted position is a third shower position or is plugged in a case where only two outlet devices are being used. Additionally, the first diverted position could instead include a third shower outlet position or a plugged position. Moreover, the mixing valve 10 may be configured for no combination of tub/shower or shower/shower fixture operation, such that each shower fixture and tub fixture is only independently supplied with flow, for example, for a total of three independent diverted positions only. Notably, rotation of the diverter control handle 24 results in co-rotation of the temperature control handle 22, but such co-rotation does not result in temperature change of an outflow of the mixing valve 10. This is because the temperature control handle 22 is rotatable independently of and relative to the diverter control handle 24 in order to change the temperature of the outflow of the mixing valve 10.

Figure 2:
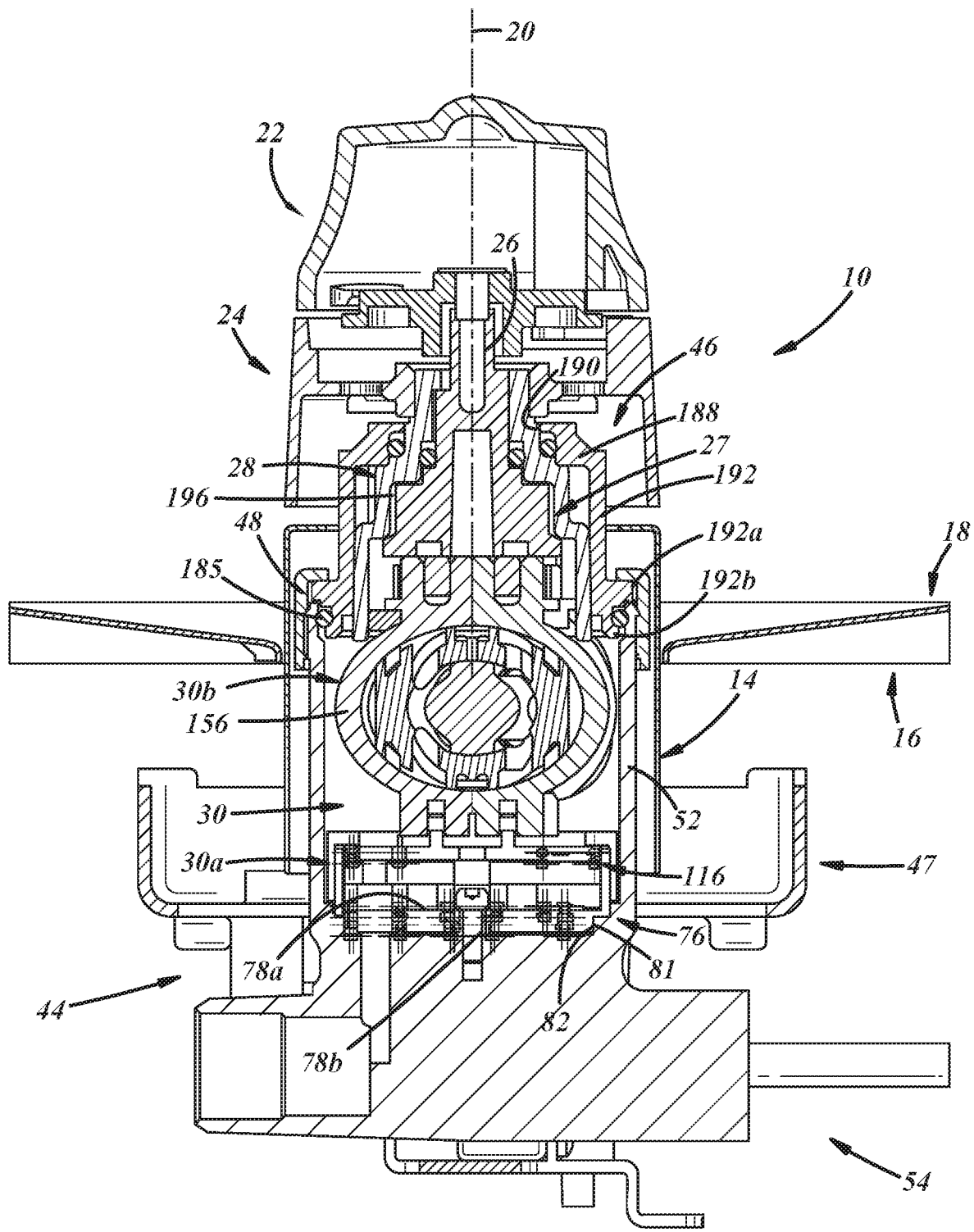
FIG. 2 is a longitudinal cross-sectional view of the mixing valve of FIG. 1, illustrating the escutcheon plate and tube, the diverter control handle, and the temperature control handle of FIG. 1, and further illustrating portions of a valve body, a valve body mounting flange and brackets, valve body outlet tubes, a modular assembly including a pressure balancer and temperature controller module and a flow diverter module, and a bonnet and a bonnet retainer.

With reference to FIG. 2, and discussed in further detail below, the mixing valve 10 further includes a valve body 44 on the rear side 16 of the escutcheon plate 12, and the pressure balancing, temperature controlling, and flow diverting assembly 30 carried by the valve body 44. Further, the mixing valve 10 may include a bonnet 46 and a corresponding bonnet retainer 48 to sealingly retain the assembly 30 to the valve body 44.

Figure 3:
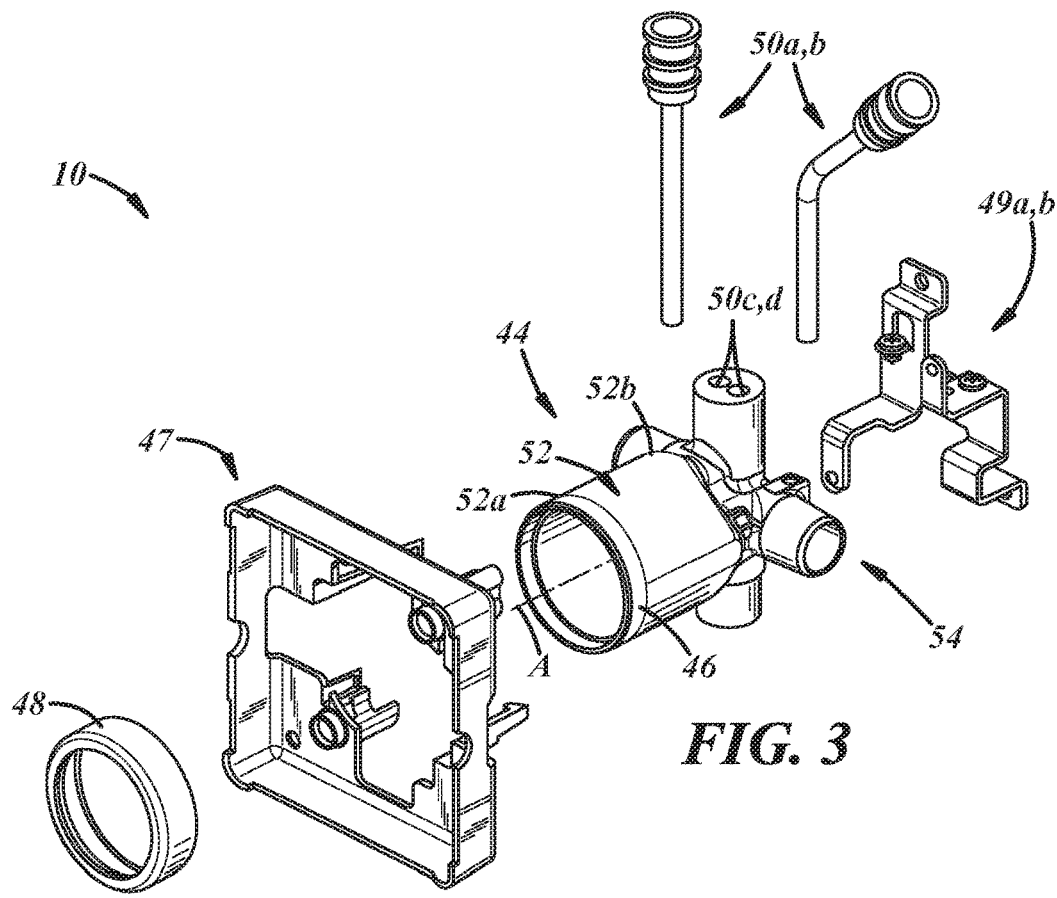
FIG. 3 is an exploded perspective view of the valve body, valve body mounting flange (plaster guard) and brackets, valve body outlet tubes, and retainer of FIG. 2.

Also with reference to FIG. 3, the mixing valve 10 may include a valve body mounting flange 47 used to mount the valve body 44 to a portion of a building (not shown) as is known to those of ordinary skill in the art. Additionally, the mixing valve 10 may include brackets 49a,b to mount the valve body 44 to other portions of the building. Those of ordinary skill in the art will recognize that the brackets 49a,b and their accompanying screws can be oriented in any manner suitable to mount the brackets 49a,b to the valve body 44 and to the building. Finally, the mixing valve 10 may also include flexible outlet tubes 50a,b coupled to the valve body 44 as shown in the illustrated embodiment, and/or the mixing valve body 44 may include multiple ports 50c,d adapted to accept PEX, copper, or like conduits (not shown).

With continued reference to FIG. 3, the valve body 44 includes a cylinder 52 establishing a central longitudinal axis A of the valve body 44 and including a forward portion 52a and a rearward portion 52b, and a manifold 54 extending away from the rearward portion 52b of the cylinder 52. The retainer 48 may be threaded, or otherwise coupled, to the forward portion 52a of the valve body cylinder 52. The mounting flange 47 and the brackets 49a,b may be used to mount and locate the mixing valve 10 in a desired location in a wall of a building. Also, the outlet tubes 50a,b can be soldered, brazed, welded, press fit, adhered, or otherwise coupled, to the corresponding outlet ports 50c,d of the valve body 44, and the outlet tubes 50a,b can be flexed to bend toward the right, the left, or straight upwardly, depending on how the mixing valve 10 is configured, for example, in a back-to-back arrangement.

Figure 4:
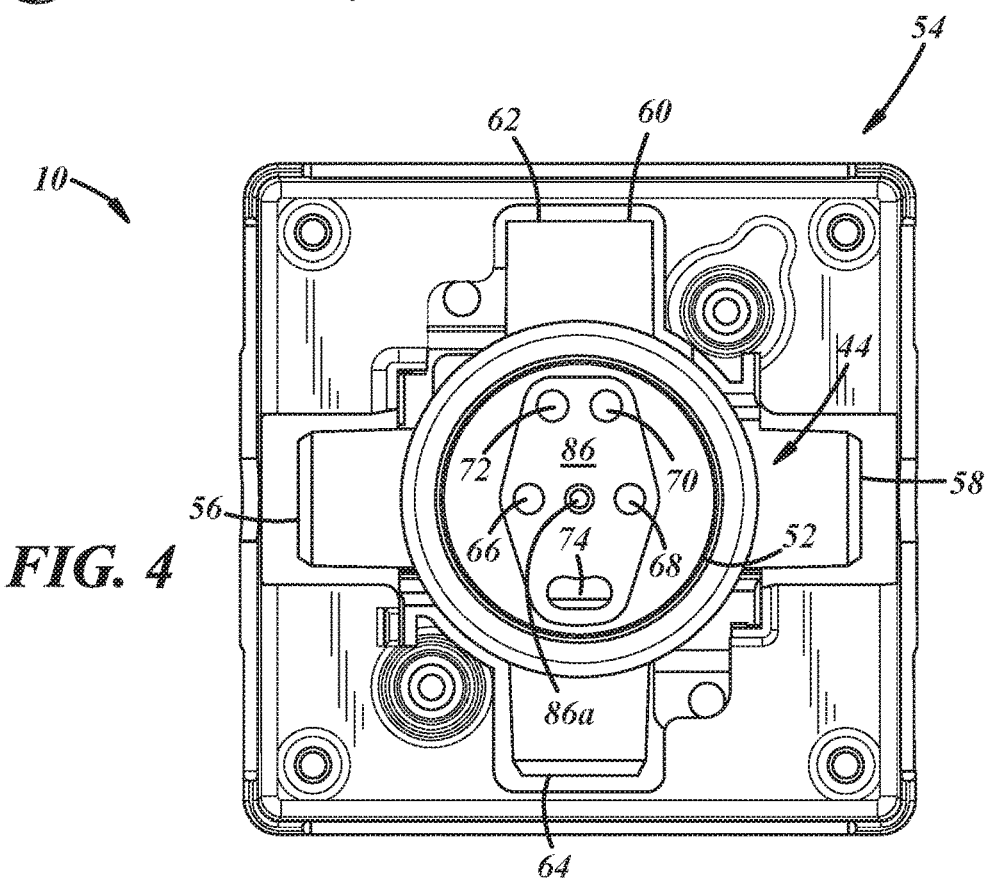
FIG. 4 is an axial end view of the valve body, valve body mounting flange, and retainer of FIG. 2.

With reference to FIG. 4, the manifold 54 of the valve body 44 includes an external plumbing interface having a plurality of inlets and a plurality of outlets. The inlets and outlets may include a hot water inlet 56 and a cold water inlet 58, and two or more outlets. The two or more outlets may include a first shower outlet 60, a second shower outlet 62, and/or a tub outlet 64. The manifold 54 also includes an internal diverter interface 86 disposed in the cylinder 52 and in fluid communication with the pluralities of inlets and outlets of the manifold 54. The internal diverter interface 86 may include a plurality of inlet apertures and a plurality of outlet apertures. The inlet apertures may include a hot water aperture 66 and a cold water aperture 68. The hot and cold water apertures 66, 68 could be swapped, for example, to accommodate a back-to-back arrangement of two mixing valves. The outlet apertures may include two or more outlet apertures, which may include a first shower outlet aperture 70, a second shower outlet aperture 72, and/or a tub outlet aperture 74.

With reference to FIG. 5, the mixing valve 10 may be a modular mixing valve wherein the pressure balancing, temperature controlling, and flow diverting assembly 30 is modular in that it includes a flow diverter module 30a and a pressure balancer and temperature controller module 30b. In this embodiment, the pressure balancer and temperature controller module 30b is separate from and configured for fluid communication with the flow diverter module 30a, and is configured to be coupled to the handles 22, 24 (FIG. 1) and as will be described in further detail below. Also, the modules 30a,b may be rotatable about a common module rotation axis 20', which may be coaxial with the handle rotation axis 20 (FIG. 1). As shown in FIG. 2, the diverter module 30a is configured to be carried in the cylinder 52 of the valve body 44. Likewise, the pressure balancer and temperature controller module 30b is carried in the cylinder 52 of the valve body 44 on an axial side of the flow diverter module 30a opposite that of the valve body manifold 54.

With reference again to FIG. 5, the diverter module 30a includes a cup 76 that is configured to be rotationally fixed to the valve body 44 (FIG. 2). The cup 76 includes a base wall 78, and a sidewall 80 extending away from the base wall 78. With reference again to FIG. 2, an exterior lower portion 81 of the cup 76 is stepped in conformity with an interior stepped pocket 82 of the valve body 44. Also, one or more exterior portions of the cup 76 may be adapted for cooperation with respect to one or more corresponding interior portions of the valve body 44, so as to be fixed against rotation with respect to the valve body 44, using, for instance, flats, splines, pegs/holes, keys/keyways, or other like features.

With reference to FIG. 6, the base wall 78 of the cup 76 includes a manifold interface 88 configured for registration with the diverter interface 86 (FIG. 4) of the manifold 54 of the valve body 44. The manifold interface 88 includes a plurality of inlet apertures and a plurality of outlet apertures. The inlet apertures may include a diverter hot water aperture 90 and a diverter cold water aperture 92. The outlet apertures include at least two outlet apertures, which may include a diverter first shower outlet aperture 94, a diverter second shower outlet aperture 96, and a diverter tub outlet aperture 98. Also, a cup seal 100 may be carried by the manifold interface 88 of the cup 76 for sealing between the diverter and manifold interfaces 86 (FIG. 4), 88. The cup seal 100 may include a plurality of boundaries between the various apertures. For example, the boundaries may include a diverter hot water boundary 100*a*, a diverter cold water boundary 100*b*, a diverter first shower boundary 100*c*, a diverter second shower boundary 100*d*, and a diverter tub boundary 100*e*.

Figure 7:
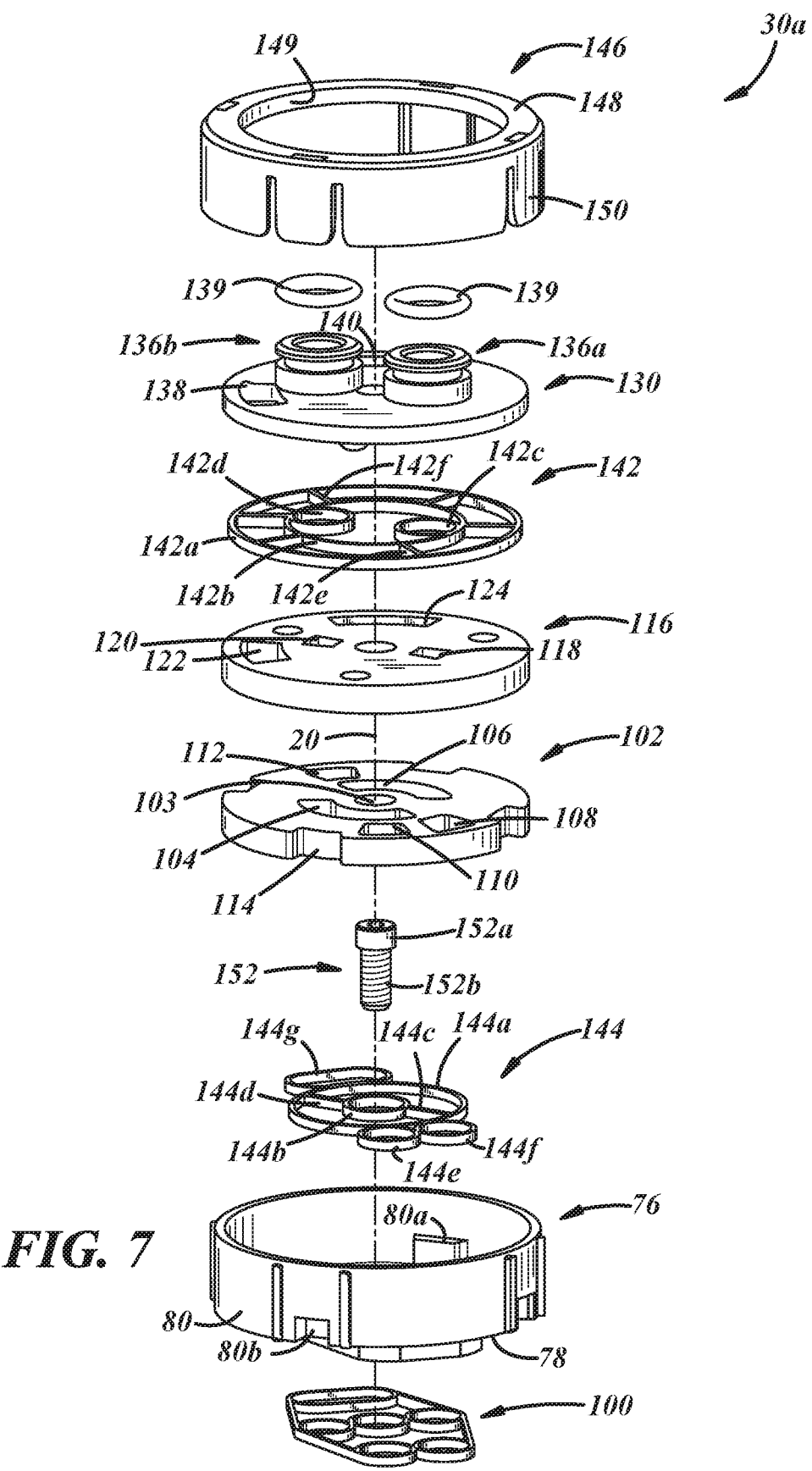
FIG. 7 is an exploded perspective view of the flow diverter module of FIG. 2.
Figure 8:
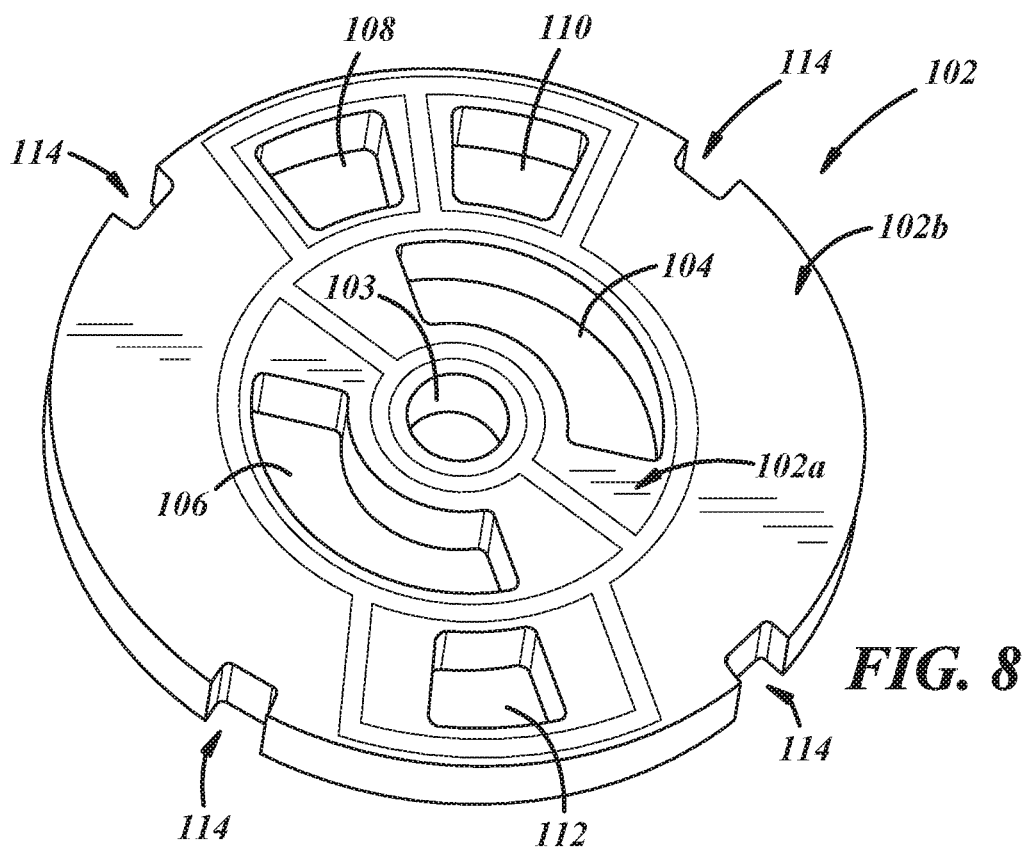
FIG. 8 is a perspective view of a fixed valve plate of the flow diverter module of FIG. 7.

With reference to FIGS. 7 and 8, the diverter module 30*a* includes a stationary plate or fixed valve 102, which may be carried in the cup 76 on an axial side of the base wall 78 of the cup 76 opposite that of the valve body 44. With reference to FIG. 8, the fixed valve 102 includes a plurality of inlets in a radially inner region 102*a* of the fixed valve 102, and a plurality of outlets in a radially outer region 102*b* of the fixed valve 102. The inlets may include a fixed hot water valve inlet 104 and a fixed cold water valve inlet 106. The outlets may include at least two outlets, which may include a first fixed shower valve outlet 108, a second fixed shower valve outlet 110, and/or a fixed tub valve outlet 112. A radially outer periphery of the fixed valve 102 may include one or more anti-rotation features for cooperation with one or more corresponding anti-rotation features of the cup. In the illustrated embodiment, the fixed valve 102 may include slots 114 in the radially outer periphery, for cooperation with corresponding projections 80*a,b* (FIG. 7) projecting radially inwardly from the cup sidewall 80. In other embodiments, the fixed valve 102 may include recesses in a bottom face for cooperation with corresponding projections projecting axially from the cup base, or any other arrangement of cooperating anti-rotation features.

Figure 9:
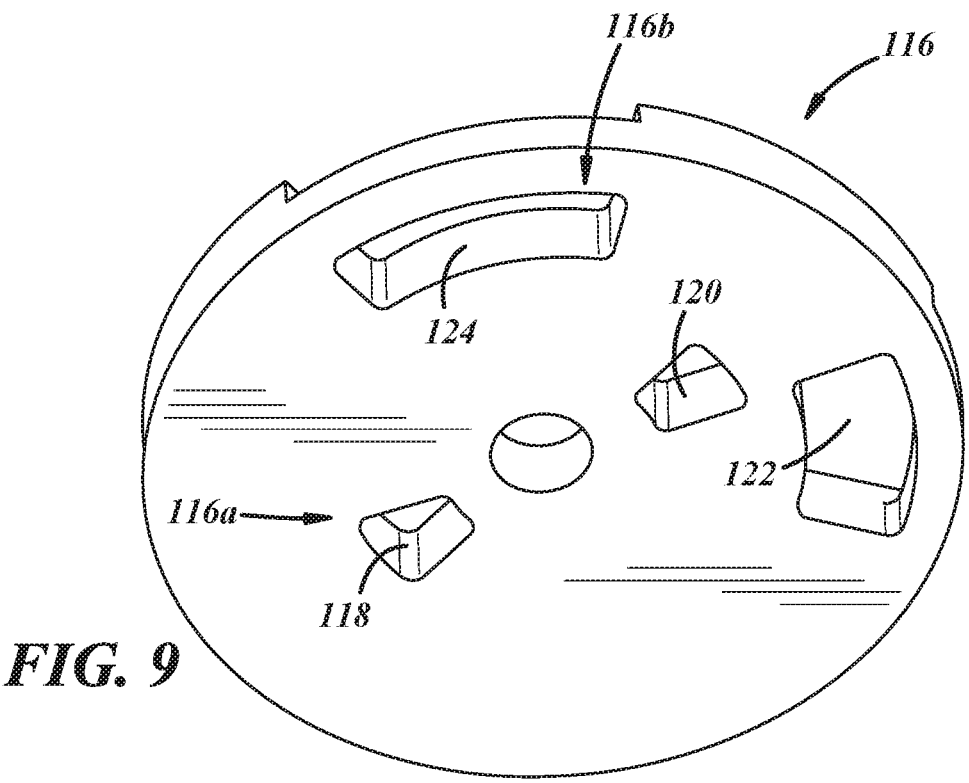
FIG. 9 is a perspective view of a rotatable valve plate of the flow diverter module of FIG. 7.

With reference to FIG. 7, the diverter module 30*a* also includes a movable plate or rotatable valve 116, which may be carried in the cup 76 on an axial side of the fixed valve 102 opposite that of the cup base wall 78 proximate the pressure balancer and temperature controller module 30*b* (FIG. 5). With reference to FIG. 9, the rotatable valve 116 includes a plurality of inlets in a radially inner region 116*a* of the rotatable valve 116 that are smaller in cross-sectional area than the corresponding inlets of the fixed valve 102 (FIG. 8). The inlets may include a rotatable hot water valve inlet 118 and a rotatable cold water valve inlet 120. The rotatable valve 116 also includes at least two outlets that are in a radially outer region 116*b* of the rotatable valve 116, and that are in selective communication with corresponding fixed valve outlets of the fixed valve 102 (FIG. 8). The outlets may include a shower valve outlet 122 being larger in cross-sectional area than either of the fixed shower valve outlets 108, 110 of the fixed valve 102 (FIG. 8), and/or a tub valve outlet 124 being of cross-sectional area larger than the fixed tub valve outlet 112 of the fixed valve 102 (FIG. 8).

Figure 10A:
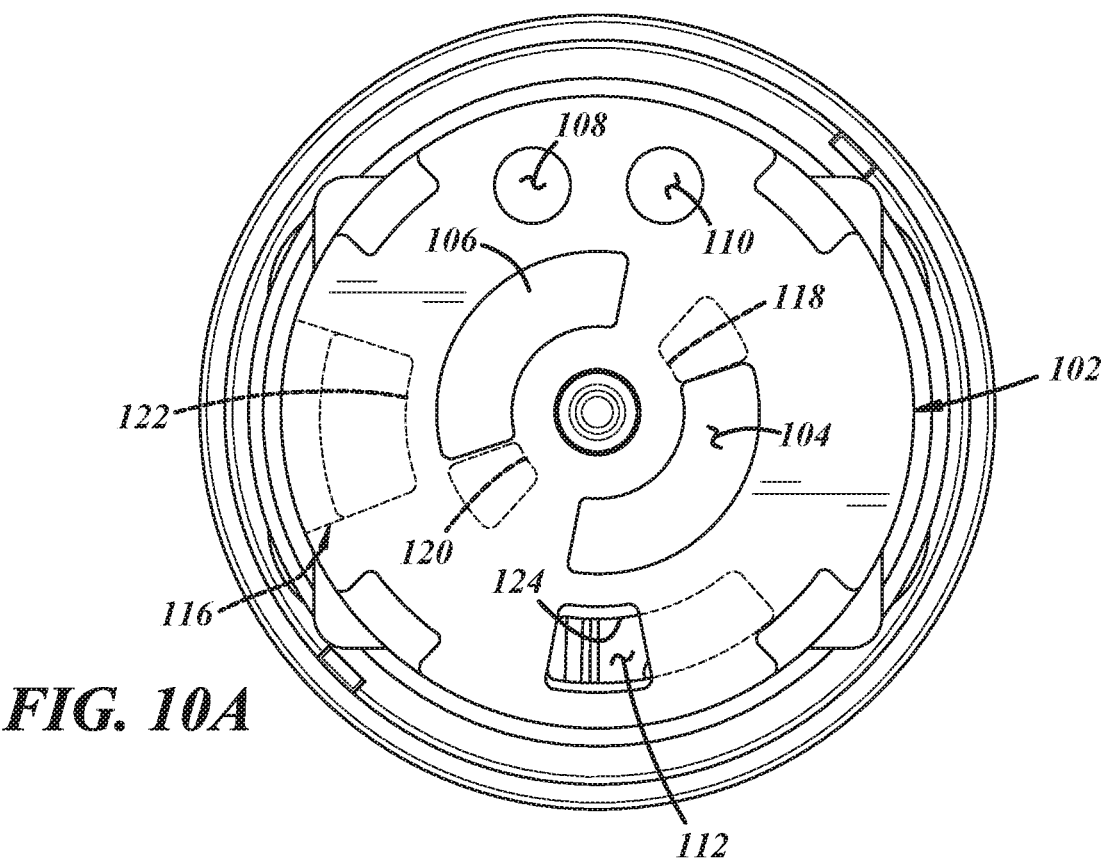
FIGS. 10A through 10E are schematic end views of portions of the rotatable valve plate superimposed on the fixed valve plate of the flow diverter module of FIG. 7.

With reference to FIG. 10*a*, the fixed valve 102 is illustrated with the inlets 118, 120 and outlets 122, 124 of the rotatable valve 116 superimposed thereon. As illustrated, the rotatable valve 116 is shown in an off position corresponding to the diverter handle off position 32 (FIG. 1), wherein the inlets 118, 120 of the rotatable valve 116 are out of registration/communication with the corresponding inlets 104, 106 of the fixed valve 102. The various outlets are arranged radially outwardly with respect to the various inlets.

Figure 10B:
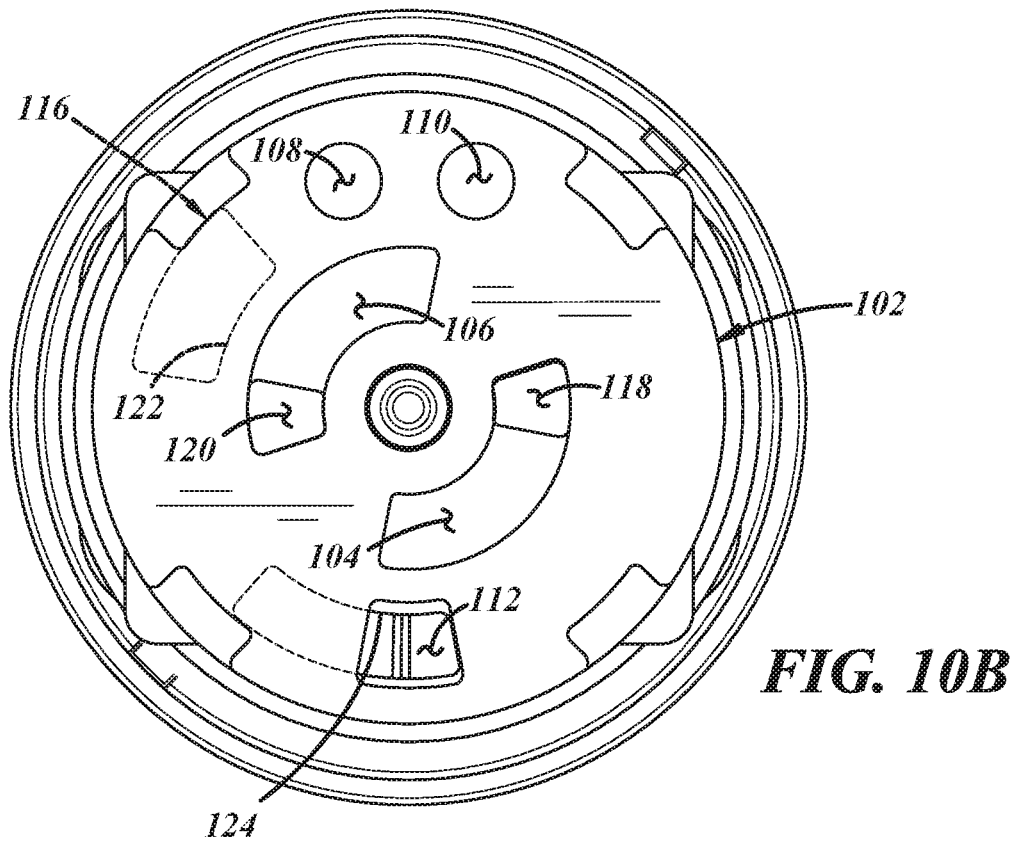

With reference to FIG. 10*b*, the rotatable valve 116 is shown rotated from the off position 32 (FIG. 1) to a first diverted position 34 (FIG. 1) wherein the inlets 118, 120 of the rotatable valve 116 are in registration/communication with the corresponding inlets 104, 106 of the fixed valve 102, and the tub outlet 124 of the rotatable valve 116 is in full registration/communication with the corresponding tub outlet 112 of the fixed valve 102.

Figure 10C:
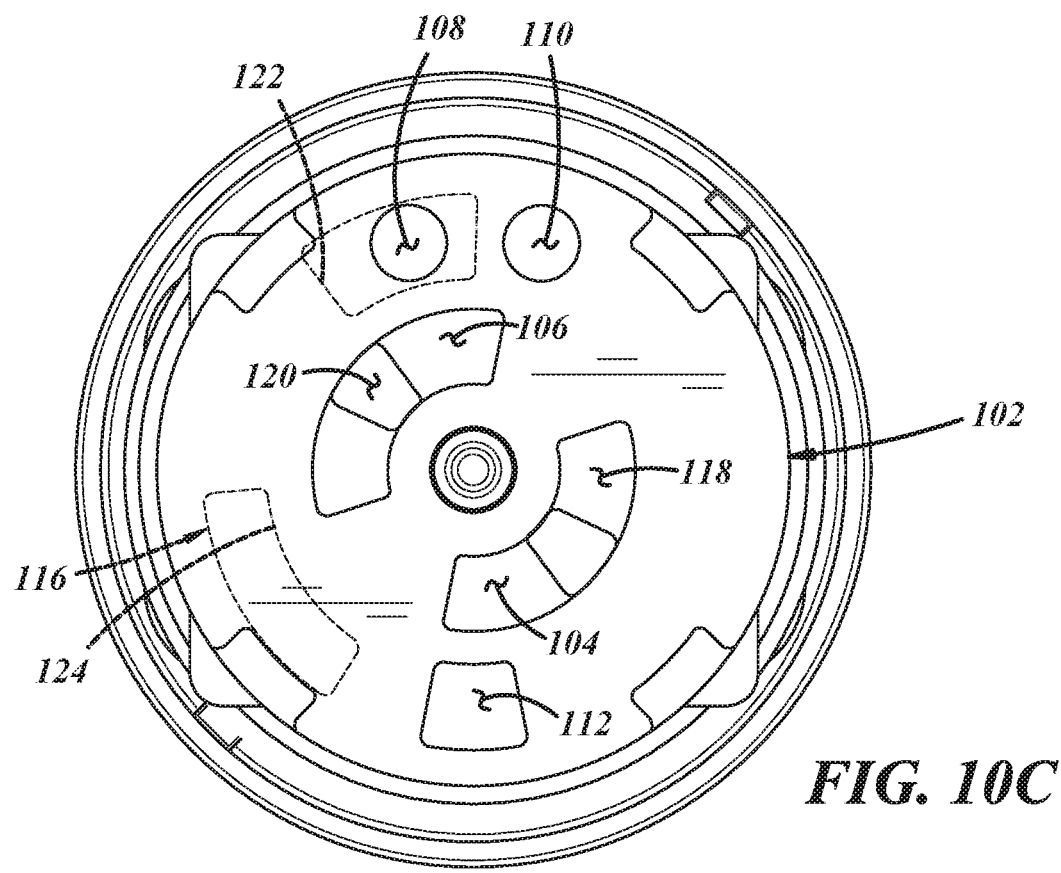

With reference to FIG. 10*c*, the rotatable valve 116 is shown rotated from the first diverted position 34 (FIG. 1) to a second diverted position 36 (FIG. 1) wherein the inlets 118, 120 of the rotatable valve 116 are still in registration/communication with the corresponding inlets 104, 106 of the fixed valve 102, and the tub outlet 124 of the rotatable valve is now out of registration/communication with the corresponding tub outlet 112 of the fixed valve 102, but the shower outlet 122 of the rotatable valve 116 is in full registration/communication with the corresponding first shower outlet 110 of the fixed valve 102.

Figure 10D:
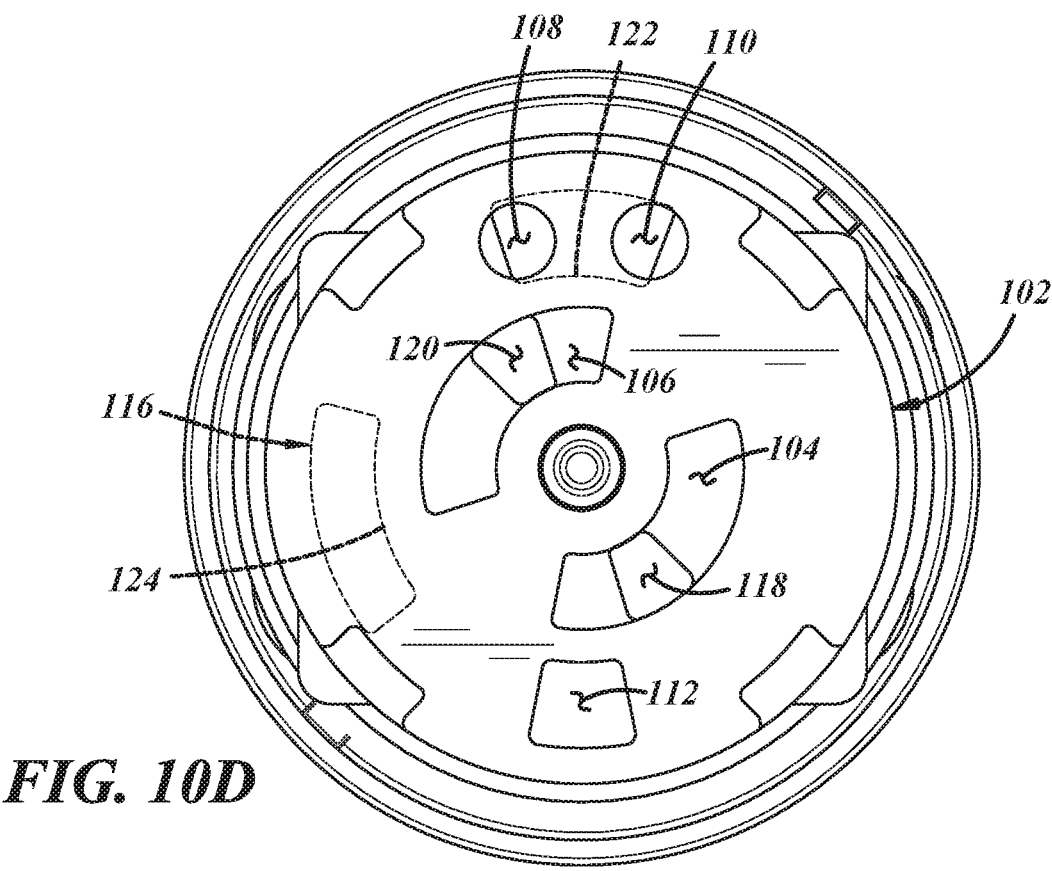

With reference to FIG. 10*d*, the rotatable valve 116 is shown rotated from the second diverted position 36 (FIG. 1) to a third diverted position 38 (FIG. 1) wherein the inlets 118, 120 of the rotatable valve 116 are still in registration/communication with the corresponding inlets 104, 106 of the fixed valve 102, and the shower outlet 122 of the rotatable valve 116 is in partial registration/communication with the corresponding first shower outlet 108 of the fixed valve 102, and the shower outlet 122 of the rotatable valve 116 is in partial registration/communication with the corresponding second shower outlet 110 of the fixed valve 102. In other words, the third diverted position 38 (FIG. 1) is in the form of a combination of the second diverted position 36 (FIG. 1) and the fourth diverted position 40 (FIG. 1).

Figure 10E:
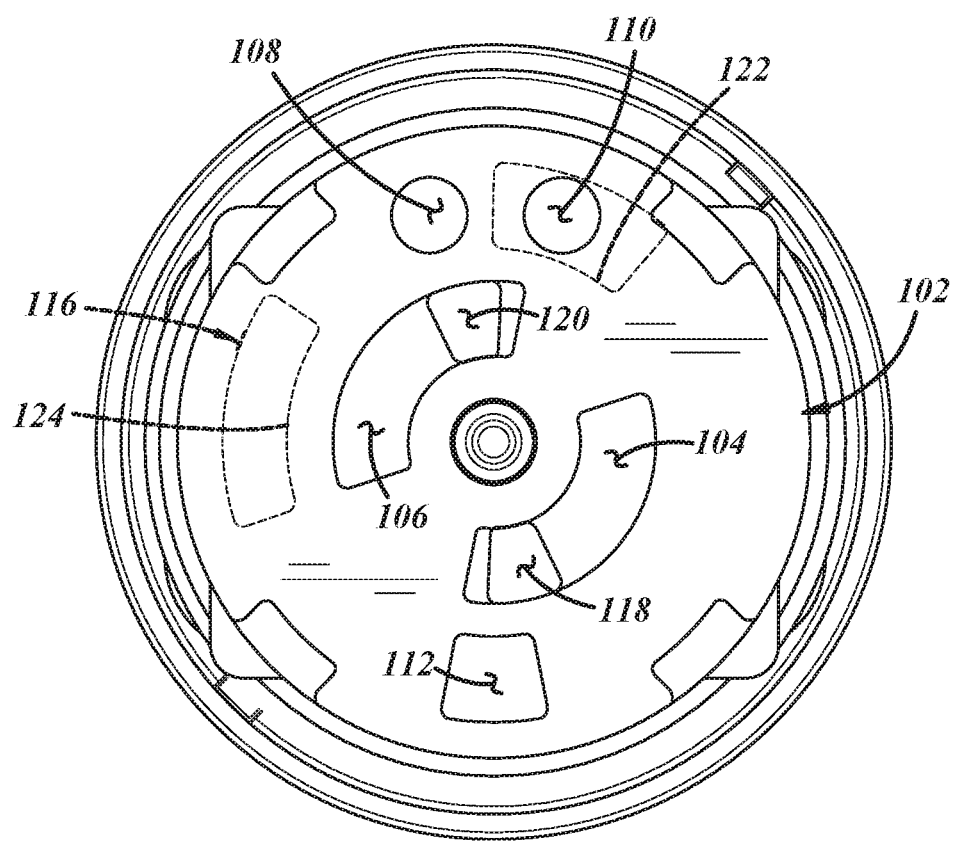

With reference to FIG. 10*e*, the rotatable valve 116 is shown rotated from the third diverted position 38 (FIG. 1) to the fourth diverted position 40 (FIG. 1) wherein the inlets 118, 120 of the rotatable valve 116 are still in registration/communication with the corresponding inlets 104, 106 of the fixed valve 102, and the shower outlet 122 of the rotatable valve 116 is now out of registration/communication with the corresponding first shower outlet 108 of the fixed valve 102, but the shower outlet 122 of the rotatable valve 116 is in full registration/communication with the corresponding second shower outlet 110 of the fixed valve 102.

In other embodiments, not illustrated, the outlets of the fixed and rotatable valves could be circumferentially spaced in any manner suitable to provide a configuration wherein the tub outlets are not in registration when the first shower outlets are in registration and wherein the first shower outlets are not in registration when the second shower outlets are in registration. In such a configuration, the tub and shower outlets would be independently operable of one another such that there would be only an off position, and three diverted "on" positions (tub, first shower, and second shower).

Figure 7A:
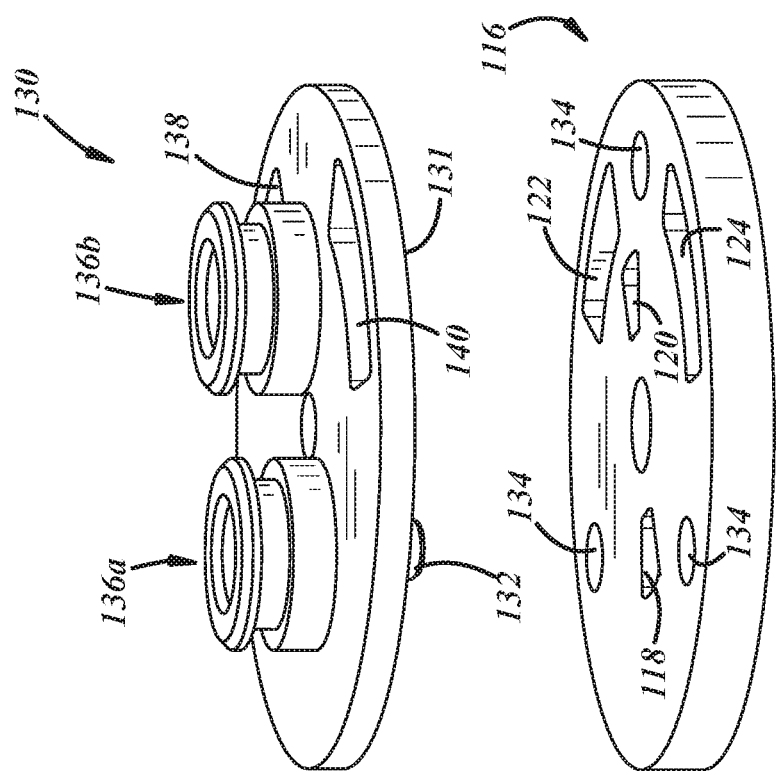
FIG. 7A is an exploded lower perspective view of a compression plate and a rotatable valve of the flow diverter module shown in FIG. 7.
Figure 7B:
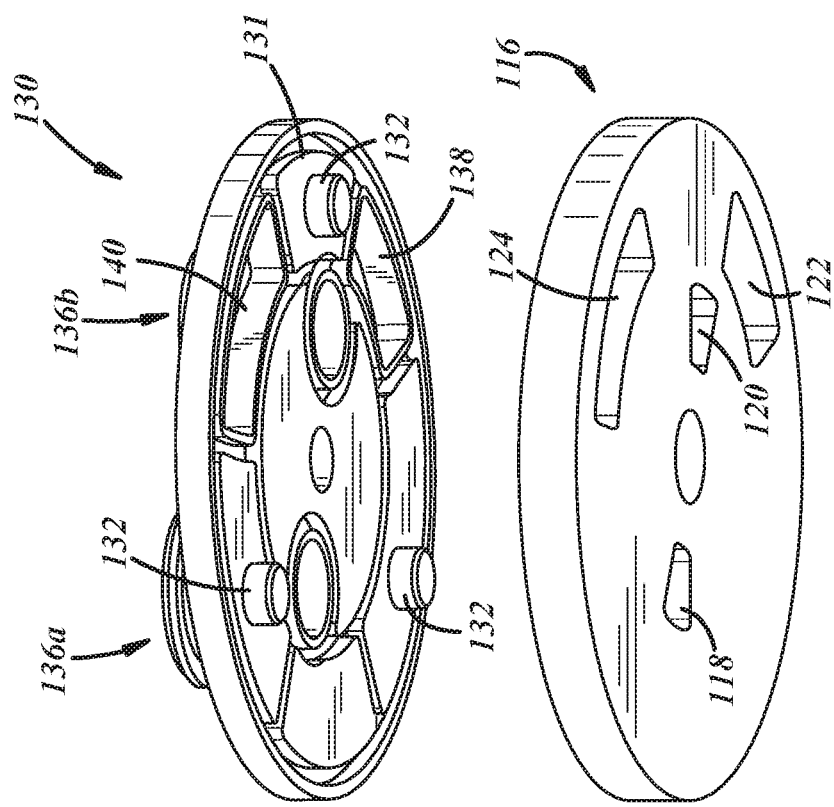
FIG. 7B is an exploded upper perspective view of the compression plate and the rotatable valve of the flow diverter module shown in FIG. 7.

With reference again to FIG. 7, the diverter module 30*a* also may include a rotatable compression plate 130, which may be carried in the cup 76 on an axial side of the rotatable valve 116 opposite that of the fixed valve 102. The rotatable compression plate 130 is rotationally fixed to the rotatable valve 116. For example, in the illustrated embodiment of FIGS. 7A and 7B, the compression plate 130 includes a plurality of projections 132 projecting from a base wall 131 thereof and into corresponding recesses or holes 134 in the rotatable valve 116. In the illustrated embodiment, the projections 132 include three circumferentially spaced, round bosses having chamfered ends. In other embodiments, any suitable quantity, spacing, and shapes of projections may be used. In still other embodiments, projections at a radially outer periphery of the compression plate may extend into corresponding slots in a radially outer periphery of the rotatable valve plate 116, or any other suitable anti-rotation features may be used. The rotatable compression plate 130 includes a plurality of inlet conduits, and a plurality of outlets. The inlet conduits 136 may include hot and cold inlet conduits 136a,b, and the outlets may include a shower outlet 138 and/or a tub outlet 140.

With reference again to FIG. 7, the diverter module 30a additionally may include one or more seals. Seals 139, for instance, O-rings, may be carried by the inlet conduits so as to sealingly couple the conduits to corresponding portions of the pressure balancer and temperature controller module 30b (FIG. 5). A compression plate seal 142 may be carried between the rotatable valve 116 and the rotatable compression plate 130. The compression plate seal 142 may include a plurality of boundaries. The boundaries may include a radially outer boundary 142a, a radially inner boundary 142b, a hot water inlet boundary 142c, a cold water inlet boundary 142d, a shower valve outlet boundary 142e, and a tub outlet boundary 142f.

Likewise, the diverter module 30a also may include a fixed valve seal 144 carried between the cup 76 and the fixed valve 102. The fixed valve seal 144 includes a plurality of boundaries, for example, radially outer and inner 144a,b boundaries, hot and cold inlet boundaries 144c,d first and second shower valve outlet boundaries 144e,f, and a tub valve outlet boundary 144g.

Moreover, the diverter module 30a further may include a cap 146. The cap 146 may include a base wall 148 having one or more apertures, for instance, an aperture 149, through which the hot and cold inlet conduits 136a,b extend. Also, the cap 146 may include a skirt 150 extending away from the base wall 148 and which may be coupled to the sidewall 80 of the cup 76 to trap the valves 102, 116 and plate 130 of the flow diverter module 30a with respect to the cup 76.

Finally, the cup 76 may be fastened to the valve body 44 (FIG. 2), for example, using a fastener, for instance, a screw 152. The screw 152 has a head 152a carried in a fastener passage 103 of the fixed valve 102 against an axially outward surface 78a (FIG. 2) of the cup 76, and also has a threaded body 152b extending through a fastener passage 78b (FIG. 2) of the cup 76 into a corresponding threaded hole 86a (FIG. 4) in the diverter interface 86 of the valve body 44 (FIG. 4). The fastener 152 and corresponding passages in the diverter module 30a and in the valve body 44 may be centrally located along the rotation axis 20 of the rotatable valve body 106.

Figure 11:
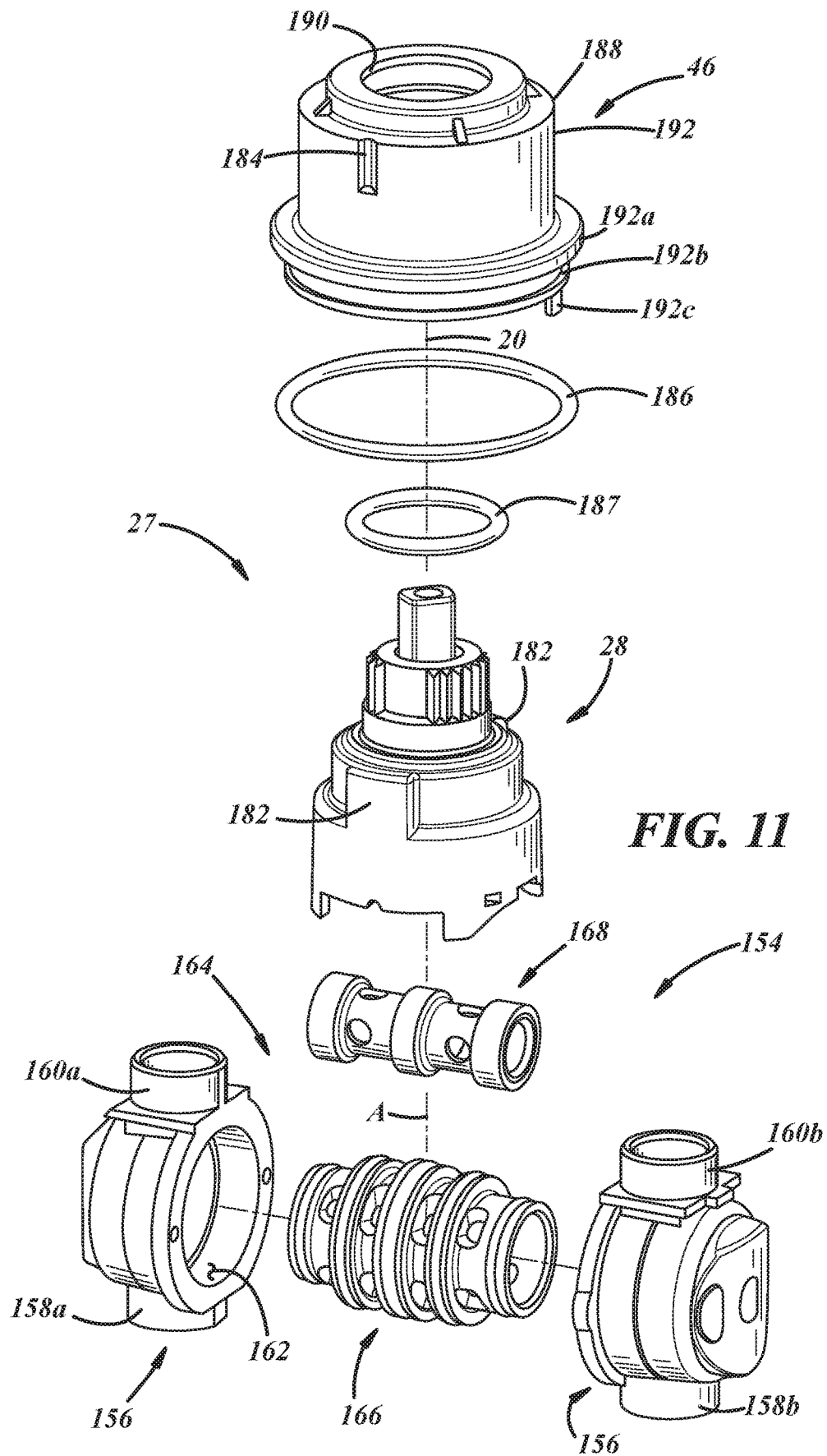
FIG. 11 is an exploded perspective view of the pressure balancer and temperature controller module of FIG. 2.

With reference to FIGS. 5 and 11, the pressure balancer and temperature controller module 30b generally may include a pressure balancer valve assembly 154 configured to be sealingly coupled to the diverter module 30a, and the temperature control valve 27 configured to be operatively coupled with the pressure balancer valve assembly 154. The pressure balancer and temperature controller module 30b also generally may include the sleeve 28 carried over and around the rotatable temperature control valve 27 and configured to rotate with the pressure balancer valve housing 156 about the common rotation axis 20.

Figure 12:
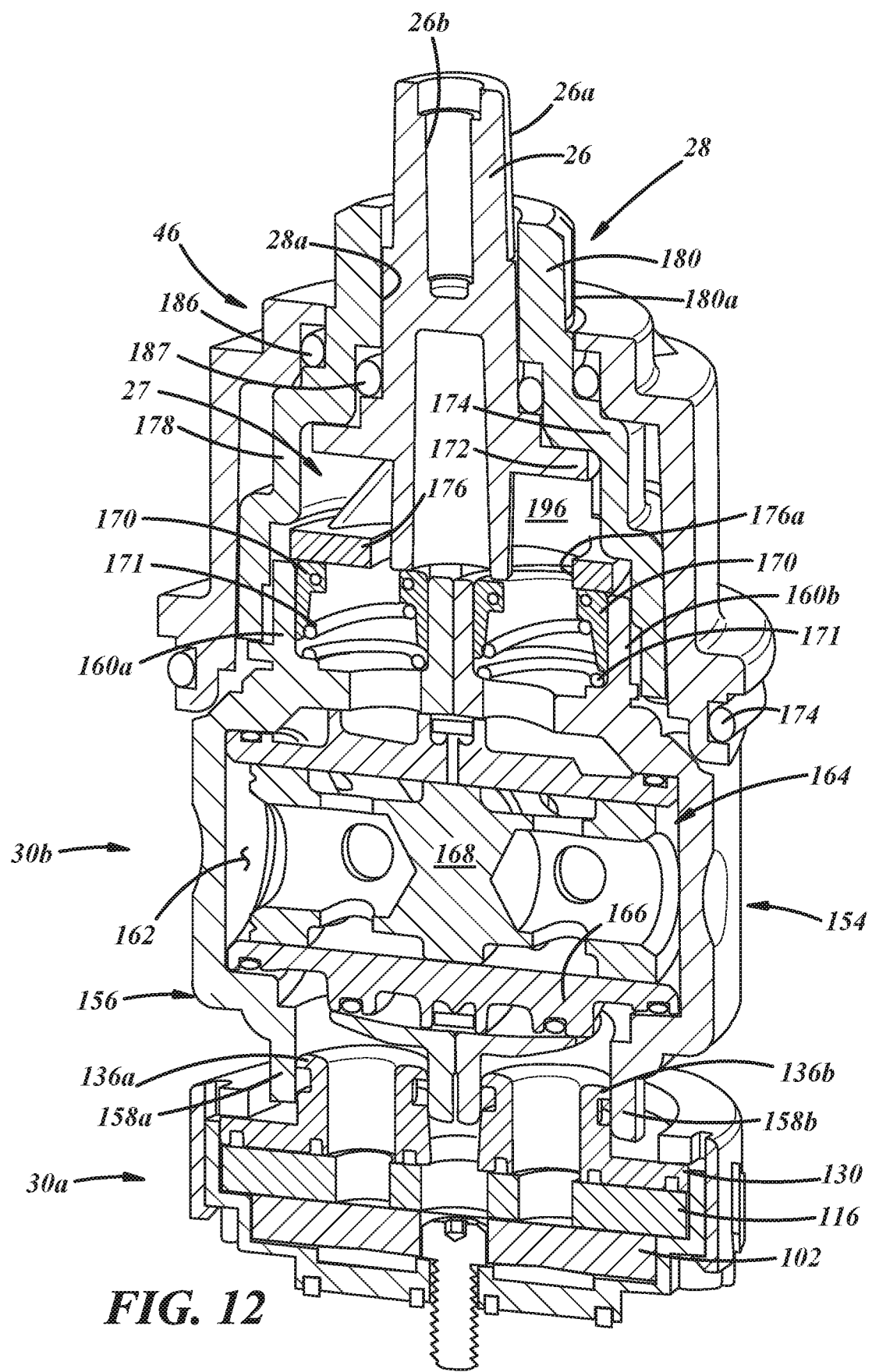
FIG. 12 is a perspective cross-sectional view of the modular assembly of FIG. 2.

With reference to FIGS. 5, 11 and 12, the pressure balancer valve assembly 154 includes the pressure balancer valve housing 156 having valve housing hot and cold water inlet conduits 158a,b in communication with the compression plate hot and cold water inlet conduits 136a,b (FIGS. 5 and 12), and valve housing hot and cold water outlet conduits 160a,b (FIGS. 11 and 12). Coupling of the corresponding hot and cold water inlet conduits of the modules renders the modular assembly 30 rotatable as a unit. With reference to FIGS. 11 and 12, the pressure balancer valve housing 156 also includes a pressure balancer chamber 162 between the valve housing hot and cold water inlet and outlet conduits 158a,b, 160a,b, and a pressure balancer valve 164 carried in the pressure balancer chamber 162 of the valve housing 156. The valve 164 includes a fixed valve body 166, and a slidable spool valve 168 carried in the fixed valve body 166 and movable transversely with respect to a central longitudinal axis A of the valve housing 156 to balance pressure of water flowing out of the hot and cold water outlet conduits of the valve housing 156.

With reference to FIG. 12, the pressure balancer valve assembly 154 (FIG. 11) also may include seals 170 carried between portions of the valve housing 156 (FIG. 11) and corresponding portions of the rotatable temperature control valve 27. For example, the seals 170 may be carried in the hot and cold water outlet conduits 160a,b of the pressure balancer valve housing 156 (FIG. 11) for contact with the rotatable temperature control valve 27. Also, the seals 170 may be spring-loaded with separate coil springs 171, as shown in the illustrated embodiment, or with integral spring features, or the like. The seals 170 may be of generally cylindrical shape, having a thickened base portion and skirt portions extending therefrom, as shown in the illustrated embodiment.

The rotatable temperature control valve 27 may include a shoulder 172 trapped against a base wall 174 of the sleeve 28, a rotatable temperature control valving portion 176 in selective fluid communication with the valve housing hot and cold water outlet conduits 160a,b of the pressure balancer valve housing 156 (FIG. 11) via the seals 170, and the valve stem 26 extending through a valve stem aperture 28a of the sleeve 28. The valving portion 176 may include a plate-like configuration and may include a variably sized valve aperture 176a. The valve stem 26 may include one or more flats, ribs, serrations, splines, or other anti-rotational features 26a that may cooperate with corresponding features of a radially inner surface of the hub 22a (FIG. 1) of the temperature control handle 22 (FIG. 1) to be rotationally fixed thereto, and also may include an internally threaded passage 26b to receive an externally threaded fastener (not shown) that may be used to fasten the temperature control handle 22 (FIG. 1) to the valve stem 26 as will be discussed below.

With continued reference to FIG. 12, the sleeve 28 may include the sleeve base wall 174, a sleeve skirt 178 extending away from the base wall 174 and being rotationally fixed to the pressure balancer valve housing 156 (FIG. 11), and a sleeve stem 180 extending away from the sleeve base wall 172 through the bonnet 46 and including a valve stem aperture 28a therethrough. The sleeve stem 180 may be configured for rotationally fixed coupling to the diverter control handle 24. For example, the sleeve stem 180 may include a radially outer surface that may include serrations, ribs, splines, or other anti-rotational features 180a, that may cooperate with corresponding features of a radially inner surface of the hub 24a (FIG. 1) of the diverter control handle 24 (FIG. 1) to be rotationally fixed thereto. With reference to FIG. 11, the sleeve 28 may include an external stop lug 182 that may cooperate with a corresponding internal stop lug 184 of the bonnet 46 to establish limits of rotation of the sleeve 28 with respect to the bonnet 46.

Also, with reference to FIGS. 11 and 12, the pressure balancer and temperature controller module 30b may include one or more seals. For instance, a dynamic sleeve seal 186 may be disposed between the sleeve 28 and the bonnet 46. Also, a dynamic temperature control valve seal 187 may be disposed between the rotatable temperature control valve 27 and the sleeve 28. The seals 186, 187 may be disposed between corresponding radially inwardly and outwardly facing diameters and corresponding axially inwardly and outwardly facing shoulders of the corresponding components, for instance, as illustrated in FIG. 12.

With reference again to FIG. 2, the bonnet 46 is carried over and around corresponding portions of the pressure balancer and temperature controller module 30b. For instance, the bonnet 46 is carried over and around portions of the sleeve 28 and the temperature control valve 27 and is configured to be coupled to the valve body 44, for instance, by the bonnet retainer 48, and sealed thereto, for instance, by a static seal, for instance, an O-ring 185. The bonnet 46 may include a bonnet base wall 188 having a bonnet aperture 190 therethrough, and a bonnet skirt 192 extending away from the bonnet base wall 188 and being rotationally fixed to the cylinder 52 of the valve body 44 by the bonnet retainer 48. The skirt 192 may include a locating flange 192a, a seal hub 192b extending away from the flange 192a and establishing a seal groove to carry the seal 185, and one or more locating features 192c (FIG. 11), for example, tangs or keys extending away from the seal hub 192b to cooperate with one or more corresponding locating features of the valve body 156, for instance, recesses or keyways in the valve body 156.

Figure 11A:
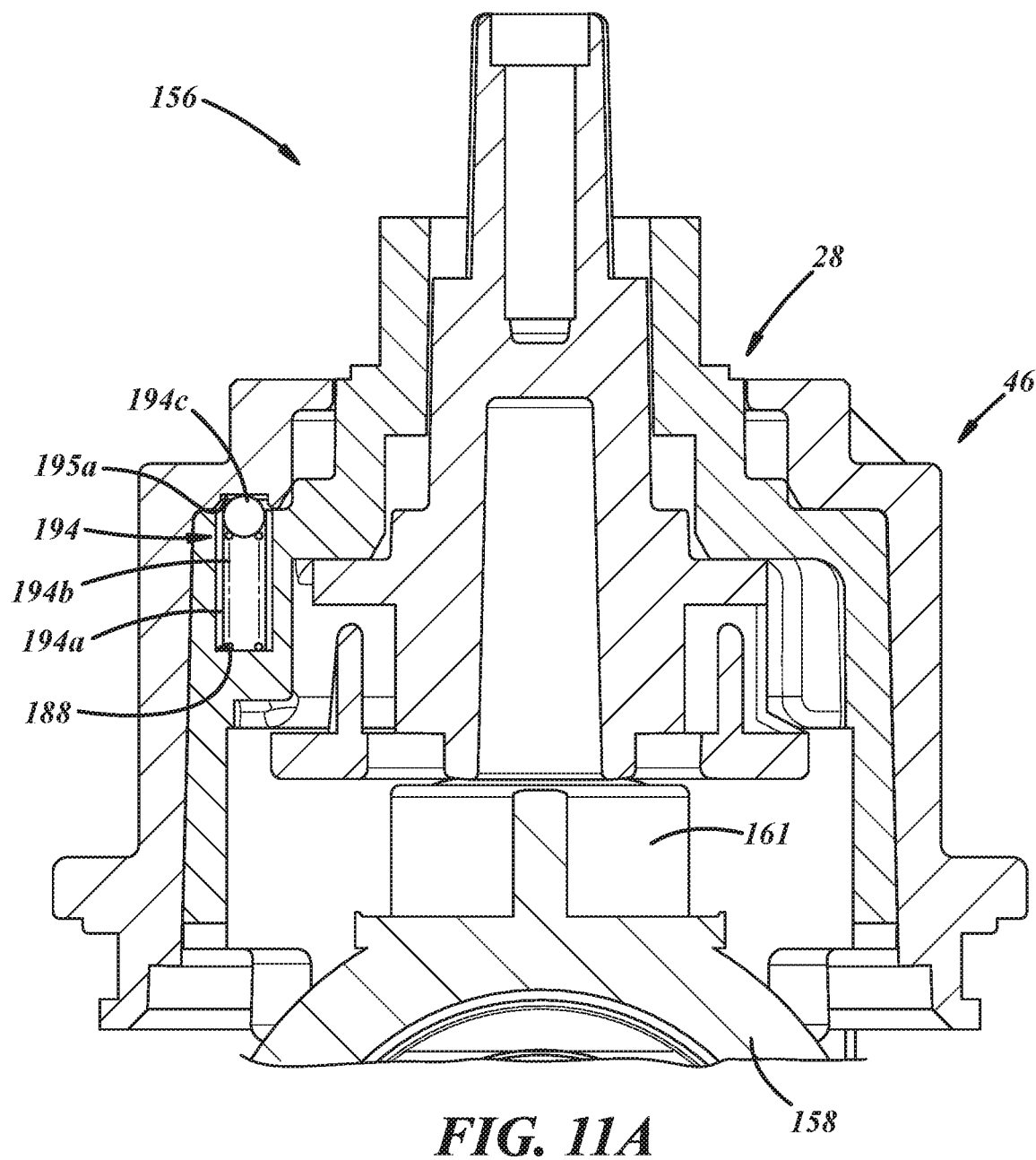
FIG. 11A is a cross-sectional view of the pressure balancer and temperature controller module shown in FIG. 11.
Figure 11B:
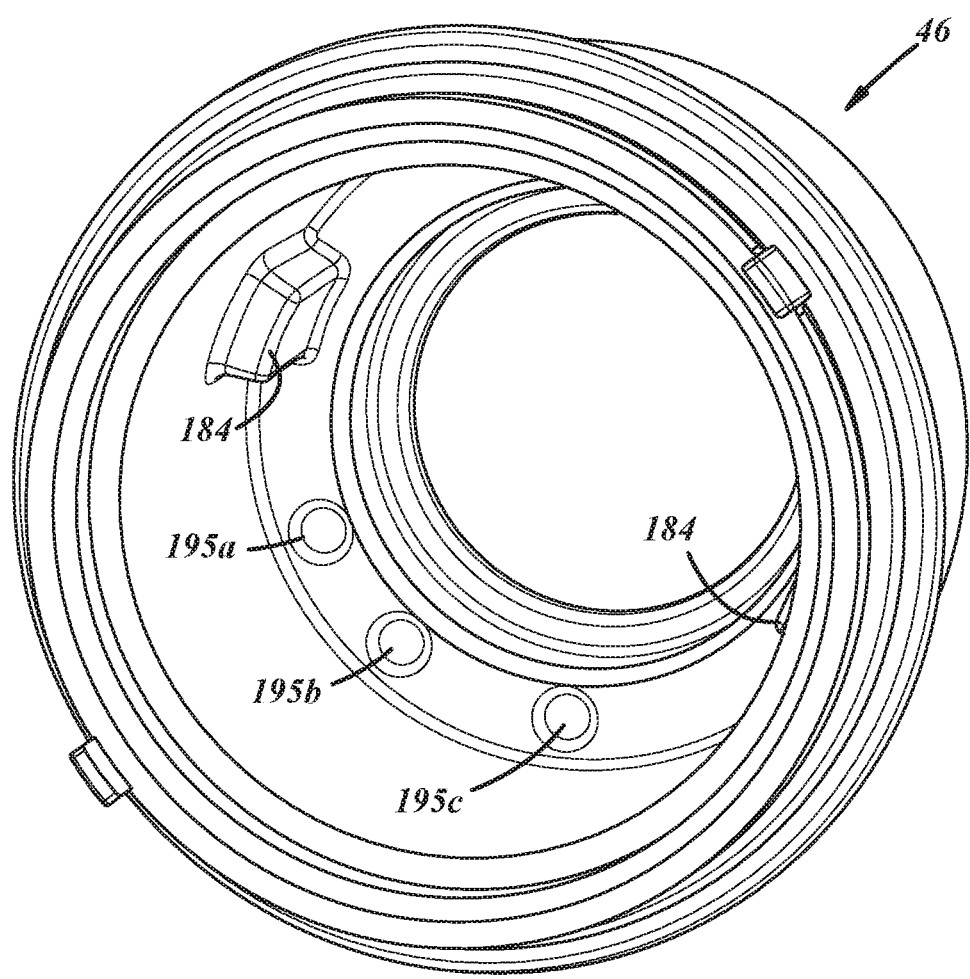
FIG. 11B is a perspective view of the bonnet of FIG. 2.

With reference to FIGS. 11A and 11B, the sleeve 28 and the bonnet 46 may include detent features that may cooperate with one another to establish detent positions of handle rotation, for instance in one or more of the handle positions, such as tub outlet, first shower outlet, and/or second shower outlet, or the like. For example, with reference to FIG. 11A, the sleeve 28 may carry a spring-loaded ball assembly 194 including a housing 194a, spring 194b, and ball 194c, wherein the housing 194a is carried in a corresponding pocket 188 of an external shoulder (e.g., of the base wall and/or the skirt) of the sleeve 28 and such that the ball 194c protrudes past an axially facing end surface of the shoulder of the sleeve 28p. Likewise, with reference to FIG. 11B, the bonnet 46 may have one or more reliefs or detents 195a,b,c in an axially facing surface of an internal shoulder of the bonnet 46 that corresponds to the external shoulder of the sleeve 28. With reference again to FIG. 11A, when the diverter handle 24 (FIG. 1) is rotated into a detented outlet position, the spring-loaded ball 194c moves in an outward direction and an outer portion of the ball 194c is received by the corresponding part-spherical relief 195a to create a ball detent combination corresponding to the particular selected handle position. Continued rotation of the diverter valve handle 24 results in the ball 194c being pushed into its housing 194a against the spring force, until the ball 194c encounters the next relief, wherein the spring force pushes the ball 194c into the next relief for the next detent position.

Accordingly, and with reference to FIG. 12, the pressure balancer and temperature controller module 30 establishes a mixing chamber 196 between corresponding portions of the rotatable temperature control valve 27 and the sleeve 28. Likewise, the pressure balancer and temperature controller module 30 establishes a mixed water outlet path in communication with the mixing chamber 196. Additionally, the mixed water outlet path extends between the rotatable temperature control valve 27 and radially inner portions of the sleeve 28. Moreover, the mixed water outlet path further extends between radially inner portions of the sleeve 28 and radially outer portions of the pressure balancer valve housing 156. Likewise, and with reference again to FIG. 2, the mixed water outlet path further extends between radially outer portions of the pressure balancer valve housing 156 and radially inner portions of the valve body cylinder 52 and enters the diverter module 30a for dead-heading when the valve 116 is in the off position 32 (FIG. 1), or for diversion to one or more devices when the valve 116 is in one of the diverted positions.

Figure 13:
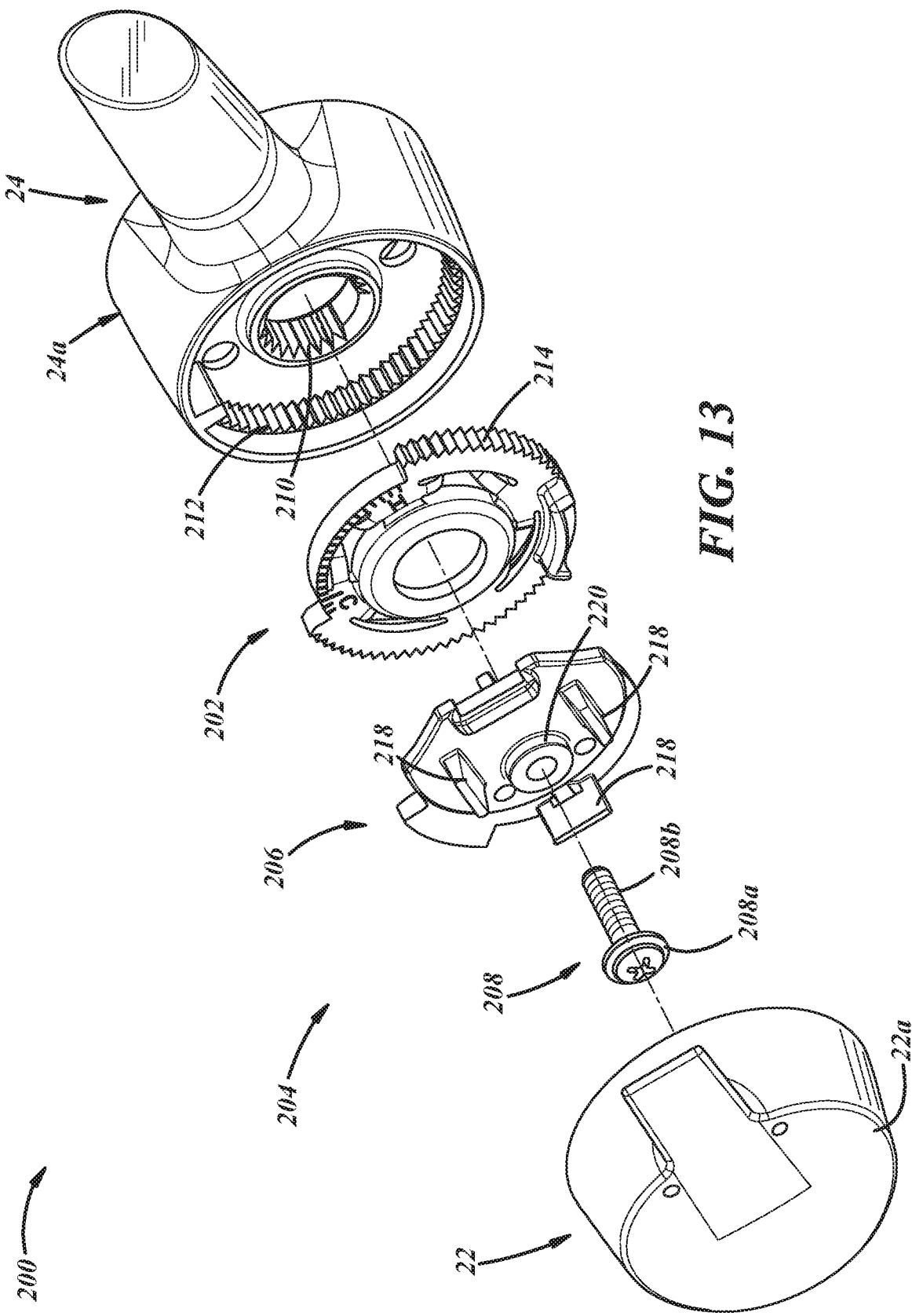
FIG. 13 is an exploded perspective view of a portion of the mixing valve of FIG. 1, illustrating the diverter control handle, a hot limit stop, a temperature control handle assembly including a handle adapter, a fastener, and the temperature control handle.
Figure 14:
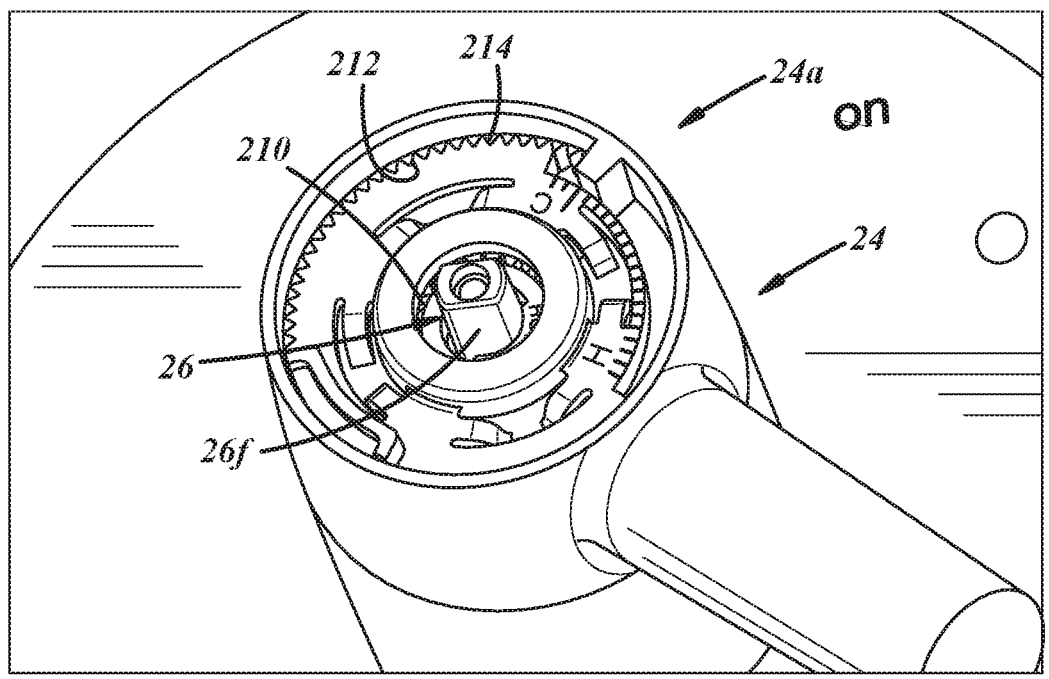
FIG. 14 is a fragmentary perspective view of a portion of the mixing valve of FIG. 2, illustrating the diverter control handle coupled to a sleeve of the pressure balancer and temperature controller module, a temperature control valve stem protruding through the sleeve, and a temperature limit stop carried by a hub of the diverter control handle.

With reference to FIG. 13, a handle assembly 200 includes the diverter control handle 24, a hot limit stop 202 carried in the hub 24a of the diverter control handle 24, and a temperature control handle assembly 204 including a handle adapter 206 for coupling to the temperature control valve stem (not shown), a fastener 208 to secure the handle adapter 206 to the temperature control valve stem (not shown), and the temperature control handle 22 for coupling to the handle adapter 206. With reference to FIGS. 13 and 14, the hub 24a of the diverter control handle 24 may include a first splined inner diameter 210 for splined coupling to a corresponding splined portion of the sleeve (not shown), and a second splined inner diameter 212 for cooperation with the hot limit stop 202. Also, the hot limit stop 202 may include a splined outer diameter 214 for splined cooperation with the second splined inner diameter 212 of the diverter control handle 24, wherein the hot limit stop 202 may be clocked with respect to the diverter control handle 24 to provide a hotter or cooler hot limit stop.

Figure 15:
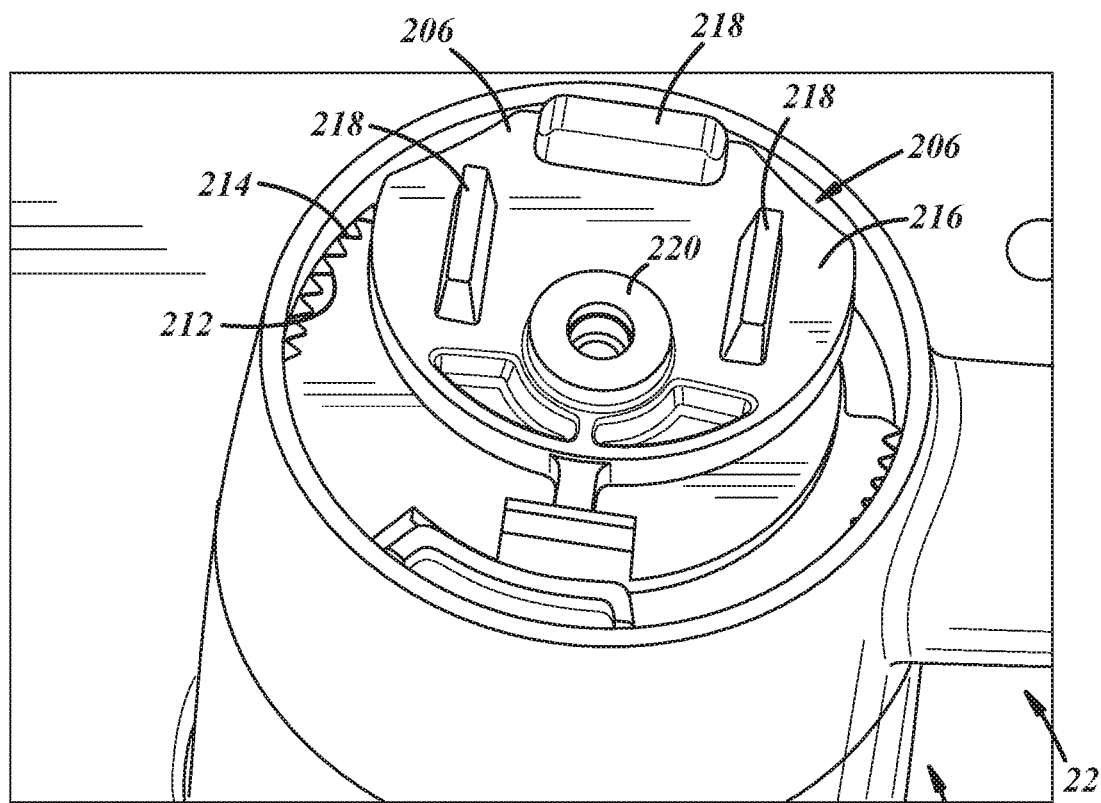
FIG. 15 is an enlarged, fragmentary, perspective view of the mixing valve shown in FIG. 14, and also including a temperature control handle adapter coupled to the temperature control valve stem, carried within the hub of the diverter control handle for cooperation with the temperature limit stop, and shown in a hot limit stop position.

With reference to FIG. 15, the handle adapter 206 may include a base wall 216, and projections 218 extending axially away from the base wall 216 for snap-fit, set-screw, or any other suitable type of fixation to the temperature control handle 22. The handle adapter 206 also may include an internal hub pocket (not shown) that may include one or more flats 26f (FIG. 14) for cooperating with the one or more flats of the temperature control valve stem 26 (FIG. 14) and a boss 220 against which the fastener locates. With reference again to FIG. 13, the fastener 208 may include a head 208a for locating against the boss 220, and a threaded shank 208b for threading into the valve stem 26 (FIG. 14). The hub 22a of the temperature control handle 22 may include any internal features for cooperating with the axially extending projections 218 of the handle adapter 206, and/or a set screw passage for accepting a set screw (not shown) for fastening the handle 22 to the adapter 206. With reference to FIG. 15, the diverter control handle 24 is shown in an off position, and the temperature control handle 22 is shown in a hot limit stop position with respect to the diverter control handle 24.

In operation, and with reference to FIG. 1, the concentric temperature control handle 22 and the sequential flow diverter control handle 24 are independently rotatable about the rotation axis 20 with respect to the valve body 44. Rotation of the sequential flow diverter control handle 24 causes rotation of the concentric temperature control handle 22 such that a hot/cold mix ratio may be maintained. But rotation of the concentric temperature control handle 22 does not necessarily cause rotation of the sequential flow diverter handle unless, of course, the temperature control handle 22 first reaches its hot limit stop or its cold limit stop.

More specifically, and with reference to FIG. 12, the temperature control handle 22 (FIG. 1) is rotatable to rotate the valve stem 26 to adjust the relative flow of water out of the valve housing hot and cold water outlet conduits 160a,b and into the mixing chamber 196. The flow diverter control handle 24 (FIG. 1) is rotatable to rotate the sleeve 28, which rotates the pressure balancer valve housing 156 of the pressure balancer and temperature controller module 30b, which rotates the compression plate 130 of the flow diverter module 30a, and which rotates the rotatable valve 116 of the flow diverter module 30a to register and deregister the rotatable shower and tub valve outlets 122, 124 of the rotatable valve 116 with respect to the fixed shower and tub valve outlets 108, 110, 112 of the fixed valve 102.

With reference to FIG. 4, hot and cold water flows into the modular mixing valve 10 through the hot and cold water inlets 56, 58 of the valve body manifold 54, and through the hot and cold water apertures 66, 68 of the valve body manifold 54. With reference to FIG. 7, the hot and cold water flows into and through the flow diverter module cup 76, through the fixed and rotatable valve inlets 104, 106 and 118, 120 of the flow diverter module valves 102, 116, and through the hot and cold inlet conduits 136a,b of the rotatable compression plate 130. With reference to FIG. 12, the hot and cold water flows through the pressure balancer valve housing 156, through the temperature control valve 27, and into the mixing chamber 196 to produce hot and cold mixed water. With reference to FIG. 2, the hot and cold mixed water flows out of the mixing chamber 196, and through the mixed water outlet path, and through the cylinder 52 of the valve body 44. With reference to FIG. 7, the hot and cold mixed water flows through the compression plate mixed water outlet, through one or both of the compression plate shower or tub outlets 138, 140, through one or both of the rotatable valve shower or tub outlets 122, 124, and through one or more of the fixed valve shower or tub outlets 108, 110, 112. With reference to FIG. 6, the hot and cold mixed water flows through one or more of the diverter shower or tub outlet apertures 94, 96, 98, and, with reference to FIG. 4, through one or more of the valve body shower or tub outlet apertures 70, 72, 74, through one or more of the shower or tub outlets 60, 62, 64 of the valve body manifold 54, and out of the valve body 44, out of the modular mixing valve 10.

With reference to FIG. 10A, the flow diverter control handle 24 (FIG. 1) is rotatable from an off position 32 (FIG. 1) where the rotatable shower and tub valve outlets 122, 124 of the rotatable valve 116 are deregistered with respect to the fixed shower and tub valve outlets 108, 110, 112 of the fixed valve 102. More specifically, the flow diverter control handle 24 (FIG. 1) is rotatable from the off position 32 (FIG. 1) to a tub outlet position 34 (FIG. 1) where the rotatable shower valve outlets 122 of the rotatable valve 116 are deregistered with respect to the fixed shower valve outlets 108, 110 of the fixed valve 102 and the rotatable tub valve outlet 124 of the rotatable valve 116 is registered with respect to the fixed tub valve outlet 112 of the fixed valve 102.

Then, with reference to FIG. 10B, the flow diverter control handle 24 (FIG. 1) is rotatable from the tub outlet position 34 (FIG. 1) to a tub and first shower valve outlet position 36 (FIG. 1) where the rotatable shower valve outlets 122 of the rotatable valve 116 are deregistered with respect to the fixed first and second shower valve outlets 108, 110 of the fixed valve 102 and the rotatable tub valve outlets 124 of the rotatable valve 116 is registered with respect to the fixed tub valve outlets 112 of the fixed valve 102.

Thereafter, with reference to FIG. 10C, the flow diverter control handle 24 is rotatable from the tub and first shower valve outlet position 36 (FIG. 1) to a first shower valve outlet position 38 (FIG. 1) where the rotatable shower and tub valve outlets 122, 124 of the rotatable valve 116 are deregistered with respect to the fixed second shower and tub valve outlets 110, 112 of the fixed valve 102, and the rotatable shower valve outlet 122 of the rotatable valve 116 is registered with respect to the fixed first shower valve outlet 108 of the fixed valve 102.

Subsequently, with reference to FIG. 10D, the flow diverter control handle 24 is rotatable from the first shower valve outlet position 38 (FIG. 1) to a first and second shower valve outlet position 40 (FIG. 1) where the rotatable tub valve outlet 124 of the rotatable valve 116 is deregistered with respect to the fixed tub valve outlet 112 of the fixed valve 102 and the rotatable shower valve outlets 122 of the rotatable valve 116 are registered with respect to the fixed first and second shower valve outlets 108, 110 of the fixed valve 102.

Finally, with reference to FIG. 10E, the flow diverter control handle 24 is rotatable from the first and second shower valve outlet position 40 (FIG. 1) to a second shower valve outlet position 42 (FIG. 1) where the rotatable shower and tub valve outlets 122, 124 of the rotatable valve 116 are deregistered with respect to the fixed first shower and tub valve outlets 108, 112 of the fixed valve 102, and the rotatable shower valve outlet 122 of the rotatable valve 116 is registered with respect to the fixed second shower valve outlet 110 of the fixed valve 102.

Accordingly, the flow diverter control handle 24 is rotatable from an off position sequentially through a plurality of diverted positions, and back through the diverted positions to the off position.

With reference to FIG. 12, those of ordinary skill in the art will appreciate that the presently disclosed mixing valve 10 establishes an inside-out flow path, wherein hot and cold inlet water flows through radially inwardly disposed inlets, whereas mixed outlet water flows through radially outwardly disposed outlets. This inside-out flow path enables the outlets to be placed in radially outward portions of valves that may be larger in surface area and/or circumference than radially inward portions of the valves. Accordingly, the outlets may be made larger in size and/or circumferentially spaced farther apart from one another than otherwise would be possible with an outside-in flow path where outlets would have to be crowded into much smaller radially inward portions of the valves.

One or more of the above-discussed embodiments may produce one or more of the following benefits. The mixing valve may be of compact design compared to prior mixing and diverter valve arrangements. The modules of the mixing valve may be independently replaceable and serviceable. The mixing valve configuration may easily accommodate an installation of two of the mixing valves mounted back-to-back with respect to one another, for instance, because the pressure balancer and temperature control module can be rotated 180 degrees relative to the diverter module, because the outlet tubes can be flexed to the left, right, or center, and/or because the handles may be flipped from a right side of the escutcheon plate to a left side of the escutcheon plate (not shown, and with a concomitant mirror image relocation of the diverter indicia).

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A mixing valve, comprising:
a sequential flow diverter control handle sequentially rotatable about a common rotation axis from an off position to at least three diverted positions; and
a concentric temperature control handle rotatable about the common rotation axis with respect to the sequential flow diverter handle,
a pressure balancer and temperature controller module including a pressure balancer housing configured for rotation with the sequential flow diverter handle, and a temperature control valve configured for rotation with the concentric temperature control handle; and
a flow diverter module separate from, and configured for rotation with, the pressure balancer housing,
wherein the concentric temperature control handle and the sequential flow diverter control handle are independently rotatable about the common rotation axis, and wherein rotation of the sequential flow diverter control handle causes rotation of the concentric temperature control handle.

2. The mixing valve of claim 1, wherein the at least three diverted positions include a first diverted position, a second diverted position, and a third diverted position.

3. The mixing valve of claim 2, wherein the at least three diverted positions also includes a fourth diverted position.

4. The mixing valve of claim 3, wherein the third diverted position is in the form of a combination of the second diverted position and the fourth diverted position.

5. The mixing valve of claim 1, wherein a first diverted position is a tub diverted position, a second diverted position is a first shower diverted position, and a third diverted position is a combination of first and second shower diverted positions.

6. The mixing valve of claim 5, wherein the at least three diverted positions also includes a fourth diverted position including the second shower diverted position.

7. The mixing valve of claim 1, wherein the concentric temperature control handle is carried axially outward of the sequential flow diverter handle.

8. The mixing valve of claim 1, wherein the modules are independently replaceable.

9. The mixing valve of claim 1, wherein the pressure balancer and temperature control module is rotatable 180 degrees relative to the diverter module to facilitate back-to-back installation.

10. The mixing valve of claim 1, wherein the flow diverter module includes diverter outlets disposed radially outwardly with respect to inlets such that the mixing valve establishes an inside-out flow path and not an outside-in flow path.

11. A modular mixing valve, comprising:
a valve body including a cylinder and a flow diverter interface;
a flow diverter module configured to be carried in the cylinder of the valve body and including a valve body interface and a rotatable diverter module; and
a pressure balancer and temperature controller module separate from the flow diverter module, carried in the cylinder of the valve body on an axial side of the flow diverter module opposite that of the flow diverter interface of the valve body, and including
a pressure balancer valve housing configured to rotate with the rotatable valve of the flow diverter module,
a rotatable temperature control valve rotatable about a common rotation axis, and
a sleeve located around the rotatable temperature control valve and configured to rotate with the pressure balancer valve housing about the common rotation axis,
wherein the temperature control valve and the rotatable diverter module are independently rotatable about the common rotation axis with respect to the valve body.

12. The valve of claim 11, further comprising:
a plurality of concentric handles coupled to the pressure balancer and temperature controller module, and including
a temperature control handle rotationally fixed to the rotatable temperature control valve, and
a flow diverter control handle rotationally fixed to the sleeve.

13. The mixing valve of claim 11, wherein the modules are independently replaceable.

14. The mixing valve of claim 11, wherein the pressure balancer and temperature control module is rotatable 180 degrees relative to the diverter module to facilitate back-to-back installation.

15. The mixing valve of claim 11, wherein the flow diverter module includes diverter outlets disposed radially outwardly with respect to inlets such that the mixing valve establishes an inside-out flow path and not an outside-in flow path.

16. A mixing valve flow diverter module, comprising
a cup including a base wall and a sidewall extending away from the base wall, wherein the base wall includes a manifold interface including a diverter hot water aperture, a diverter cold water aperture, a diverter first shower outlet aperture, a diverter second shower outlet aperture, and a diverter tub outlet aperture,
a cup seal carried by the manifold interface of the cup for sealing between the diverter and manifold interfaces, and including a diverter hot water boundary, a diverter cold water boundary, a diverter first shower boundary, a diverter second shower boundary, and a diverter tub boundary, a fixed valve carried in the cup and including a fixed hot water valve inlet and a fixed cold water valve inlet in a radially inner region of the fixed valve, and a first fixed shower valve outlet, a second fixed shower valve outlet, and a fixed tub valve outlet in a radially outer region of the fixed valve, a fixed valve seal carried between the cup and the fixed valve and including a radially inner and outer boundary, a hot and cold inlet boundary, first and second shower valve outlet boundaries, and a tub valve outlet boundary, a rotatable valve carried in the cup on an axial side of the fixed valve opposite that of the cup base wall, and including a rotatable hot water valve inlet and a rotatable cold water valve inlet in a radially inner region of the rotatable valve and being smaller in cross-sectional area than the hot and cold fixed valve inlets of the fixed valve, and a shower valve outlet being larger in cross-sectional area than either of the fixed shower valve outlets of the fixed valve and a tub valve outlet being of cross-sectional area larger than the fixed tub valve outlet of the fixed valve, wherein the shower and tub valve outlets are in a radially outer region of the rotatable valve, a rotatable compression plate carried in the cup on an axial side of the rotatable valve opposite that of the fixed valve, rotationally fixed to the rotatable valve, and including compression plate hot and cold inlet conduits, a compression plate shower outlet, and a compression plate tub outlet, a compression plate seal carried between the rotatable valve and the rotatable compression plate and including a radially outer boundary, a radially inner boundary, a hot water inlet boundary, a cold water inlet boundary, a shower valve outlet boundary, and a tub outlet boundary, and a cap including a base wall having an aperture through which the hot and cold inlet conduits extend and a skirt extending away from the base wall and coupled to the sidewall of the cup to trap the plates of the flow diverter module with respect to the cup.

17. A mixing valve pressure balancer and temperature controller module, comprising:

a pressure balancer valve assembly including a pressure balancer valve housing having valve housing hot and cold water inlet conduits, valve housing hot and cold water outlets, and a pressure balancer chamber between the valve housing hot and cold water inlets and outlets, and also including a pressure balancer valve carried in the pressure balancer chamber of the valve housing and including a fixed valve body and a slidable spool valve carried in the fixed valve body and movable to balance pressure of water flowing out of the hot and cold water outlets of the valve housing, a sleeve including a sleeve base wall, a sleeve skirt extending away from the base wall and being rotationally fixed to the pressure balancer valve housing, and a sleeve stem extending away from the sleeve base wall and including a valve stem aperture therethrough, a dynamic sleeve seal disposed between the sleeve and a bonnet, a rotatable temperature control valve between the pressure balancer valve housing and the sleeve, and including a valving portion to adjust flow out of the valve housing hot and cold water outlets, and a valve stem extending through the valve stem aperture of the sleeve, spring-loaded seals carried between the valve housing hot and cold water outlets of the pressure balancer valve housing and the rotatable temperature control valve, a dynamic temperature control valve seal disposed between the rotatable temperature control valve and the sleeve, a mixing chamber between the rotatable temperature control valve and the sleeve, and a mixed water outlet path in communication with the mixing chamber, and extending between the rotatable temperature control valve and the sleeve and between the sleeve and the pressure balancer valve housing.

18. A mixing valve modular configuration, comprising:

a pressure balancer and temperature controller module, including a pressure balancer valve assembly including a pressure balancer valve housing including valve housing hot and cold water inlets and outlets, and a pressure balancer chamber between the valve housing hot and cold water inlets and outlets, and a pressure balancer valve carried in the pressure balancer chamber of the valve housing, a sleeve including a sleeve base wall, a sleeve skirt extending away from the base wall and being rotationally fixed to the pressure balancer valve housing, and a sleeve stem extending away from the sleeve base wall and including a valve stem aperture therethrough, and a rotatable temperature control valve between the valve housing and the sleeve, and including a valving portion to adjust flow out of the valve housing hot and cold water outlets, and a valve stem extending through the valve stem aperture of the sleeve; and a flow diverter module separate from, and configured for fluid communication and rotation with, the pressure balancer and temperature controller module, and including a fixed valve including hot and cold fixed valve inlets, and first, second, and third fixed valve outlets, and a rotatable valve on an axial side of the fixed valve proximate the pressure balancer and temperature controller module, and including hot and cold rotatable valve inlets, and first, second, and third rotatable valve outlets in selective communication with the first, second, and third fixed valve outlets of the fixed valve.

19. The mixing valve modular configuration of claim 18, wherein the flow diverter module also includes a cup including a base wall and a sidewall extending away from the base wall, a rotatable compression plate carried in the cup on an axial side of the rotatable valve opposite that of the fixed valve, rotationally fixed to the rotatable valve, and including compression plate hot and cold inlet conduits coupled to the valve housing hot and cold water inlets and outlets of the pressure balancer valve housing of the pressure balancer and temperature controller module, and a cap including a base wall having an aperture through which the hot and cold inlet conduits extend and a skirt extending away from the base wall and coupled to the sidewall of the cup to trap the plates of the flow diverter module with respect to the cup.

20. The mixing valve of claim 18, wherein the modules are independently replaceable.

21. The mixing valve of claim 18, wherein the pressure balancer and temperature control module is rotatable 180 degrees relative to the diverter module to facilitate back-to-back installation.

22. The mixing valve of claim 18, wherein the flow diverter module includes diverter outlets disposed radially outwardly with respect to inlets such that the mixing valve establishes an inside-out flow path and not an outside-in flow path.

\* \* \* \* \*